United States Patent [19]
Hillstrom et al.

[11] Patent Number: 4,714,220
[45] Date of Patent: Dec. 22, 1987

[54] SIGN STAND ASSEMBLY

[75] Inventors: David U. Hillstrom, Novi, Mich.; Dennis R. Cope, Kent, Ohio

[73] Assignees: Marketing Displays, Inc., Farmington Hills, Mich.; B. F. Goodrich Company, New York, N.Y.

[21] Appl. No.: 905,673

[22] Filed: Sep. 9, 1986

Related U.S. Application Data

[63] Continuation-in-part of Ser. No. 824,745, Jan. 31, 1986, abandoned, which is a continuation-in-part of Ser. No. 784,906, Oct. 7, 1985, abandoned.

[51] Int. Cl.$^4$ .............................................. F16M 13/00
[52] U.S. Cl. ...................................... 248/160; 40/608
[58] Field of Search ............... 248/160, 609, 608, 635, 248/587, 590; 40/608, 612; 267/57.1; 116/63 R; 404/10, 11

[56] References Cited

U.S. PATENT DOCUMENTS

| | | | |
|---|---|---|---|
| 1,615,576 | 1/1927 | Estes | 404/11 |
| 1,662,298 | 3/1928 | Corey | 404/11 |
| 1,694,756 | 12/1928 | Short | 248/635 |
| 2,073,450 | 3/1937 | Limpert | 248/235 |
| 2,577,761 | 12/1951 | Hickman . | |
| 3,120,942 | 2/1964 | Savage | 248/609 X |
| 3,204,914 | 9/1965 | Meinhardt | 248/609 |
| 3,204,953 | 9/1965 | Ahrens | 248/609 X |
| 3,336,021 | 8/1967 | Kramer . | |
| 3,455,525 | 7/1969 | Waermo | 248/635 |
| 3,646,696 | 3/1972 | Sarkisian . | |
| 3,662,482 | 5/1972 | Sarkisian . | |
| 3,770,291 | 11/1973 | Kramer . | |
| 3,834,344 | 9/1974 | Yoshino | 248/635 |
| 4,033,536 | 7/1977 | Hillstrom . | |
| 4,365,435 | 12/1982 | Snyder | 40/608 |
| 4,575,036 | 3/1986 | Allekotte | 40/608 X |

FOREIGN PATENT DOCUMENTS 2484679  12/1981  France .................................. 404/10

Primary Examiner—J. Franklin Foss
Attorney, Agent, or Firm—Harness, Dickey & Pierce

[57]    ABSTRACT

A sign stand assembly is disclosed for supporting a sign in a generally upright orientation relative to a base portion of the stand assembly. The assembly includes a resilient biasing apparatus for allowing the sign to pivotally deflect in the face of winds or other forces in order to avoid tipping over the sign and sign stand assembly. The resilient biasing apparatus includes an elastomeric member that is preferably preloaded and that is torsionally deflectable during service in order to provide for such sign deflection. Such preloading greatly contributes to the durability and long service life of the resilient biasing apparatus.

45 Claims, 32 Drawing Figures

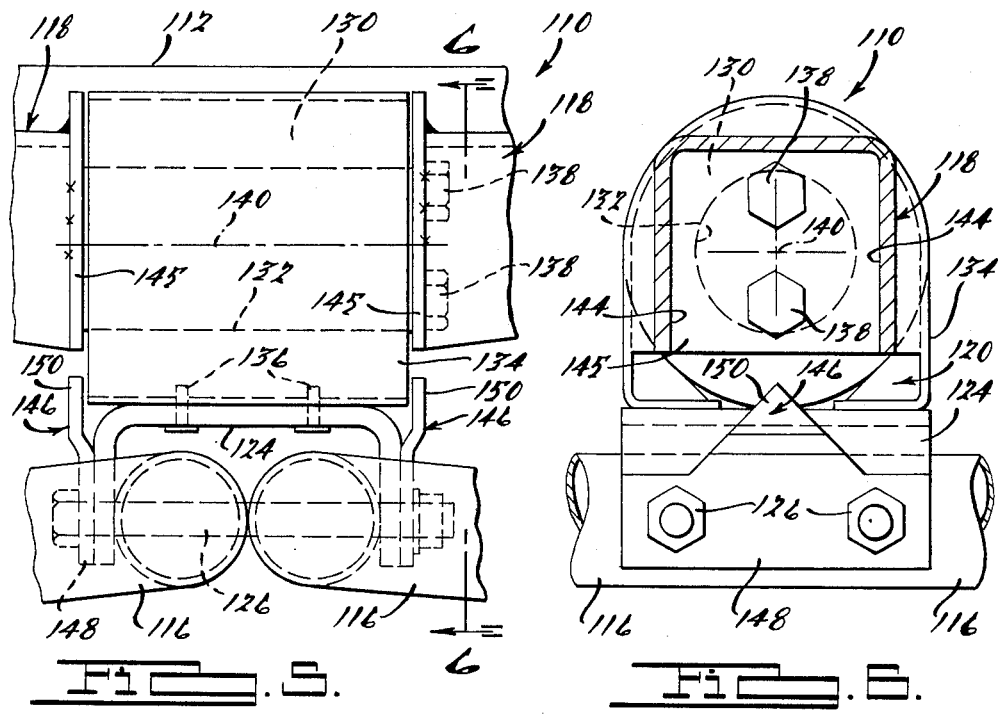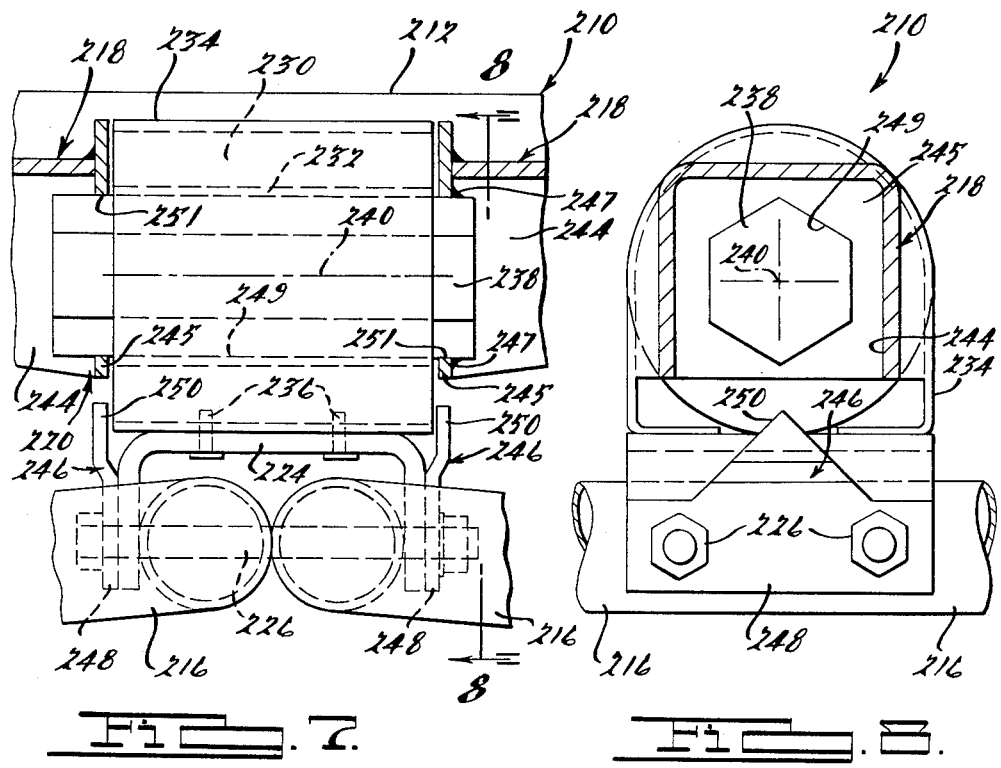

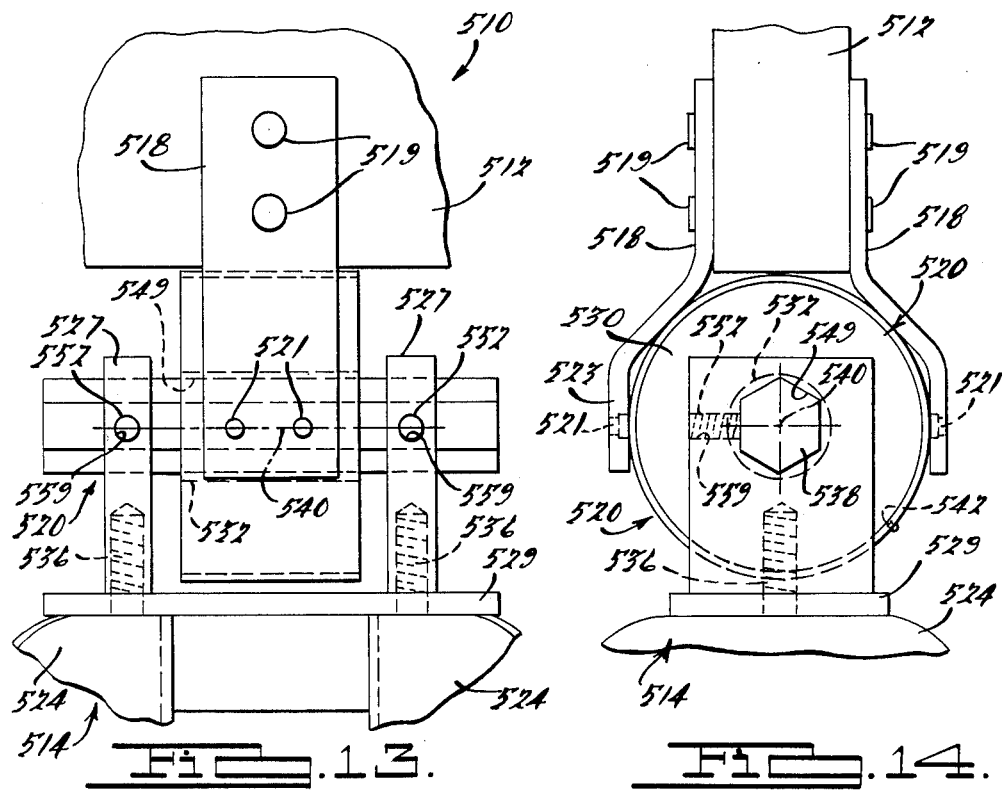
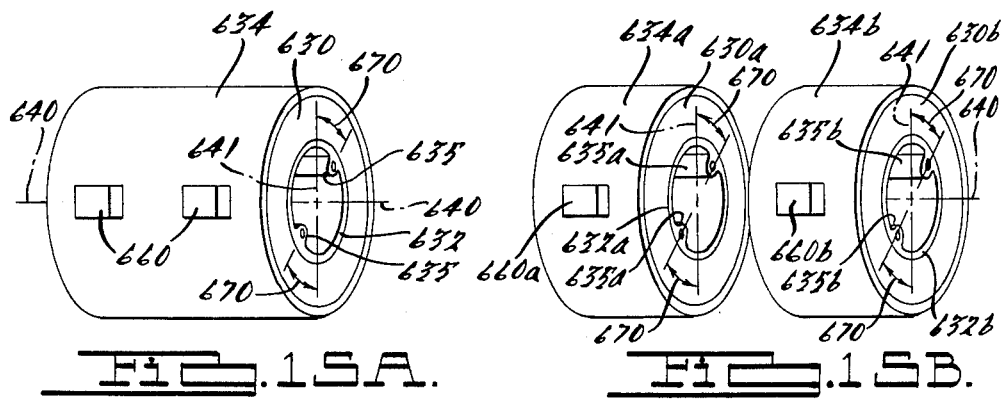
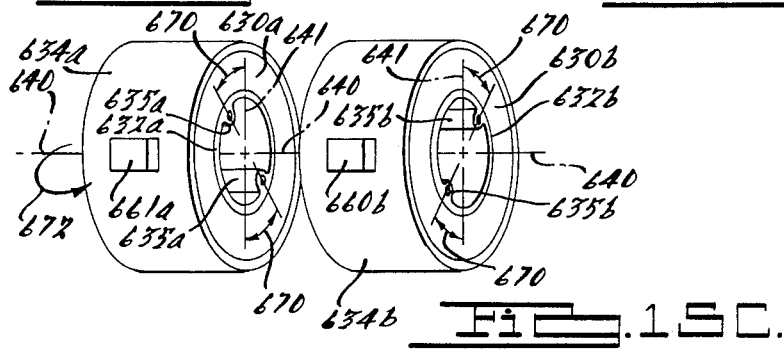

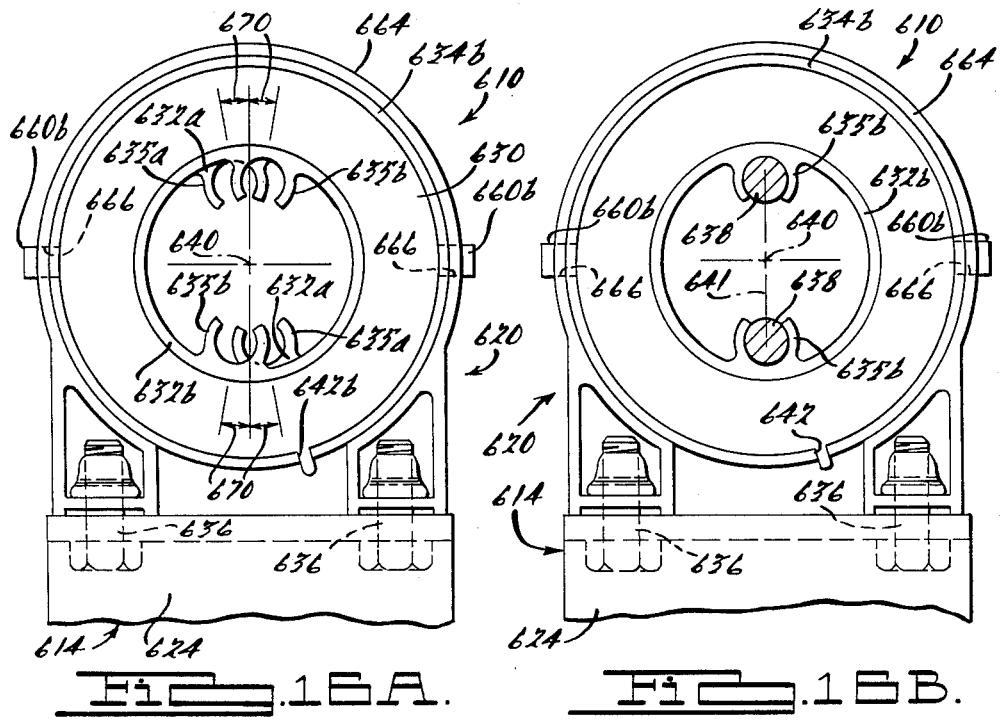
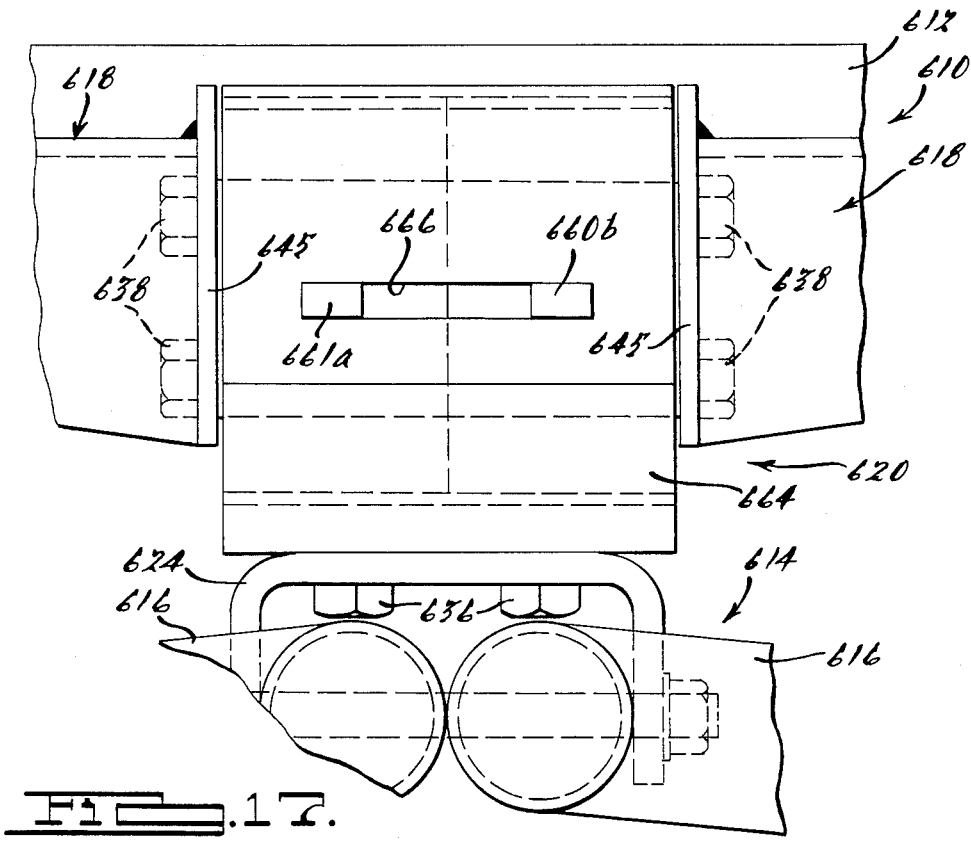

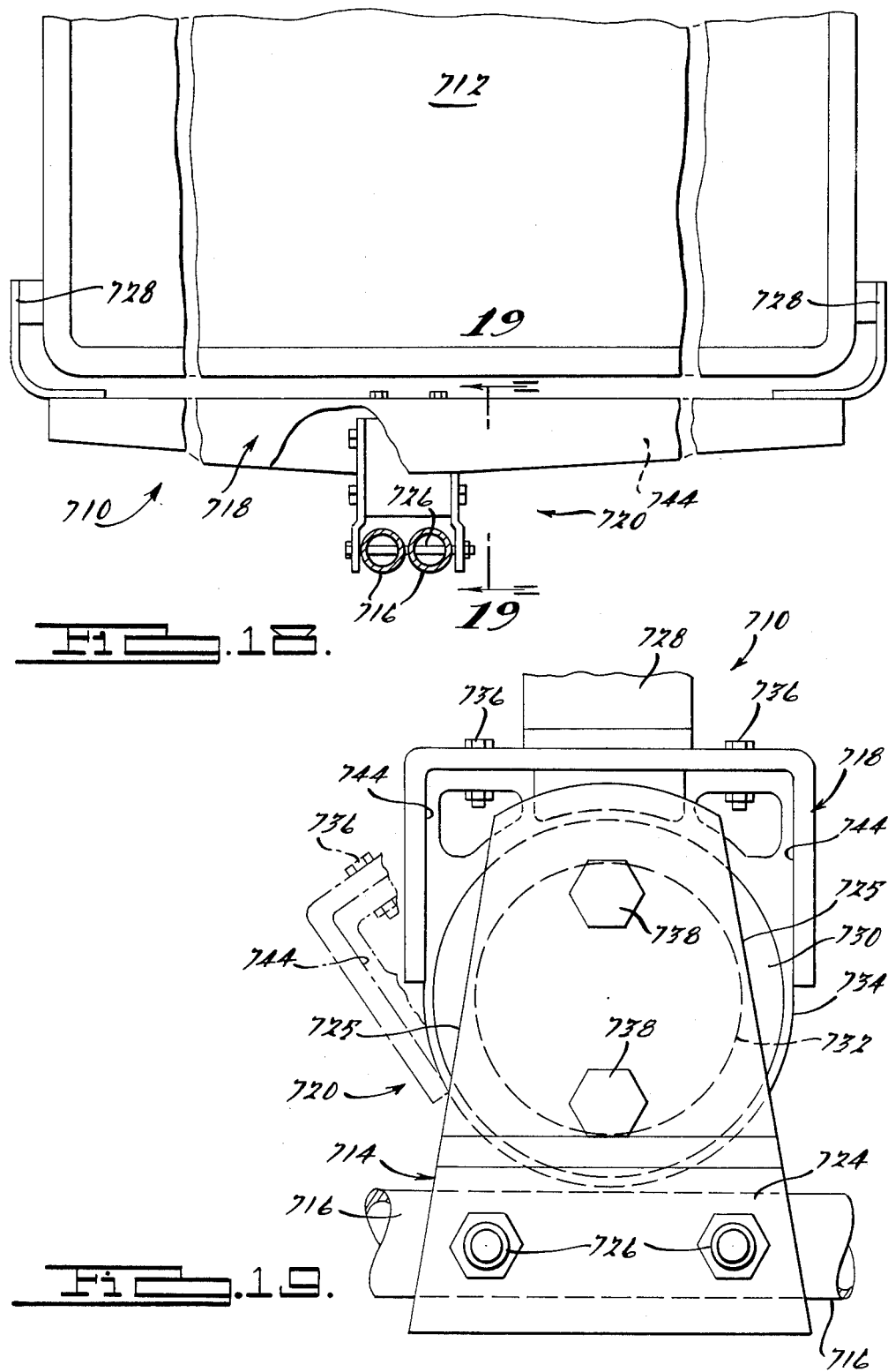

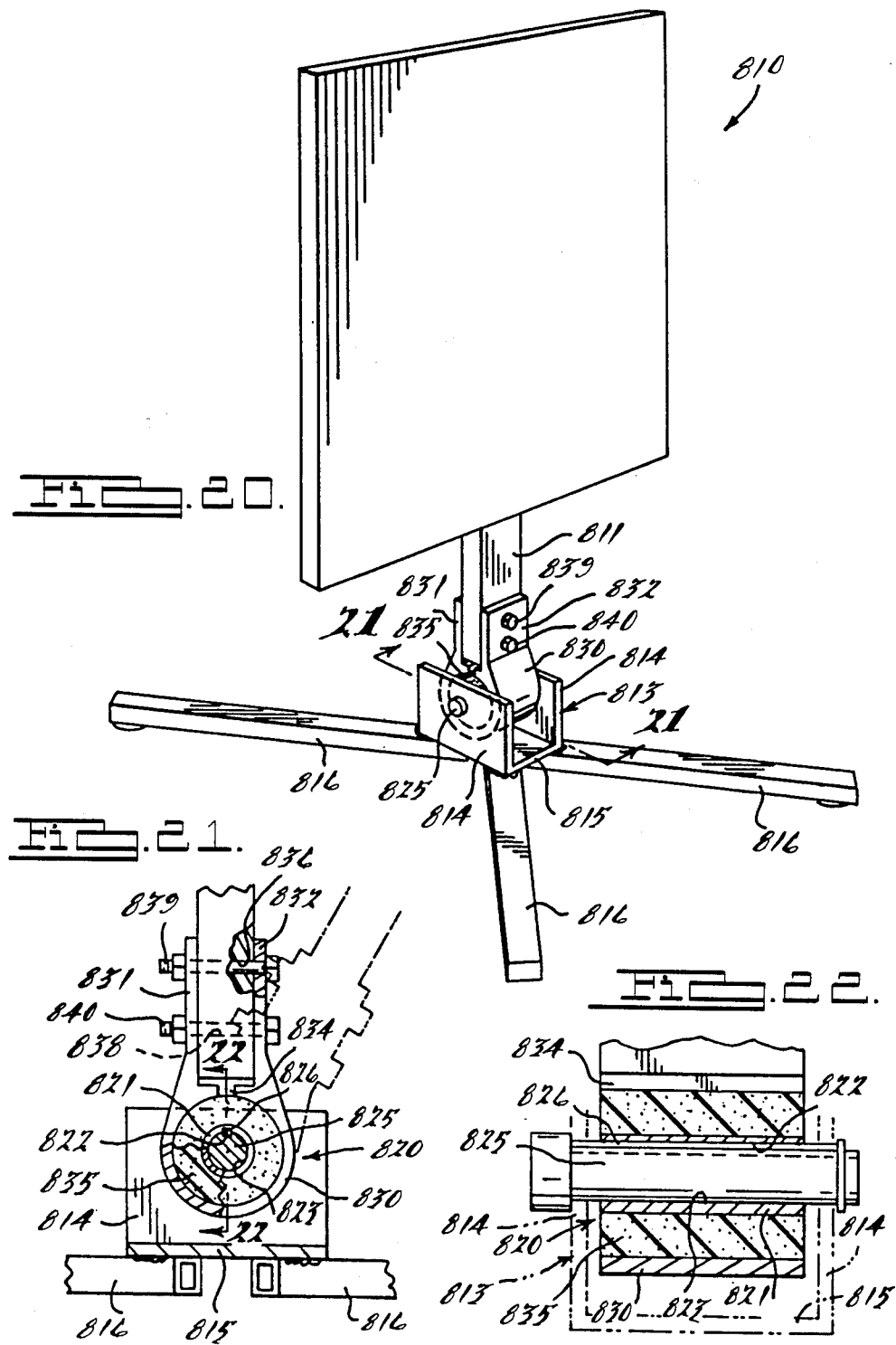

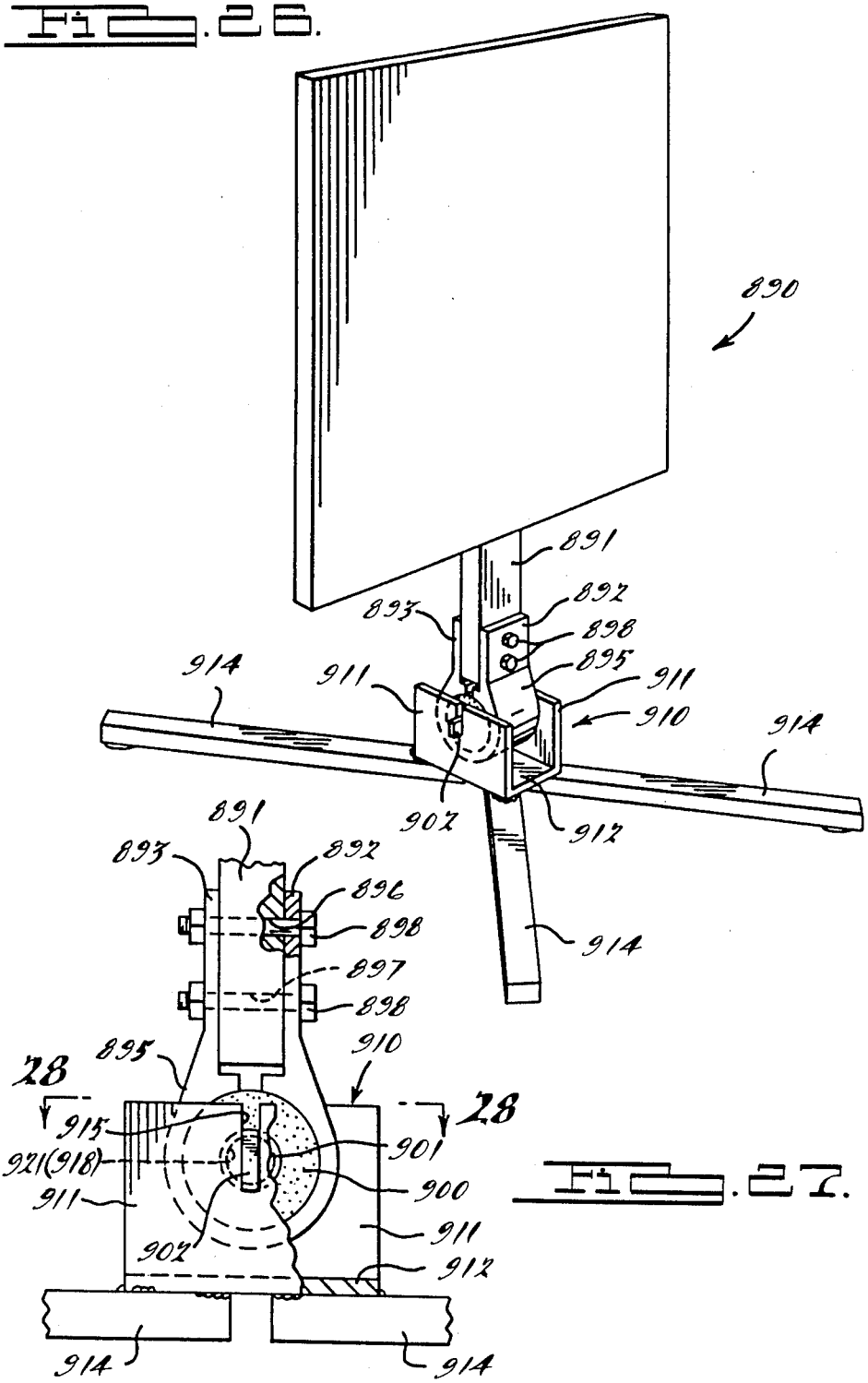

SIGN STAND ASSEMBLY

BACKGROUND AND SUMMARY OF THE INVENTION

The present application is a continuation-in-part of a copending application, Ser. No. 824,745, filed Jan. 31, 1986 now abandoned, which is a continuation-in-part of another copending application, Ser. No. 784,906, filed Oct. 7, 1985, now abandoned, the disclosures of both of which are hereby incorporated by reference herein.

The present invention relates to sign stand devices for supporting signs displaying advertising or other pertinent information, particularly at business establishments and service stations. The invention more specifically relates to such signs and sign stand assemblies that are relatively stable in the face of winds or other forces, and that are adapted for limited and controlled deflection of the sign and a portion of the sign stand assembly in order to prevent the sign and sign stand from tipping over under the influence of such forces. In some applications of the invention, the sign and sign stand assemblies can be folded or retracted into compact structures for ease of transportation or storage.

It is important that signs for advertising (or as warning signs in emergency or other situations) be visible and readable regardless of weather conditions. Many previous sign and sign stand assemblies are spring-mounted with coil springs or the like to allow the sign and a portion of the sign stand to deflect, without tipping over, under high wind forces. Such capability is especially important in signs or displays having a large display area subjected to wind or other forces. Examples of such spring-mounted sign stands are shown in U.S. Pat. Nos. 3,646,696; 3,662,482; 4,033,536; 4,265,040; 4,288,053; 4,509,714; 4,516,344; 4,544,125; 4,548,379; 4,569,499; 4,572,473; 4,575,040; and 4,593,879.

Although the sign and sign stand assemblies discussed above have performed very well in the past, it has become desirable to provide a deflectable sign stand assembly that is an improvement over prior sign stand assemblies in terms of manufacturing time and expense, weight, durability and performance, and that still maintains the ability to deflect in the face of high winds or other forces without tipping over.

In accordance with the present invention, a sign stand assembly for supporting a sign includes a base or base assembly, one or more sign-supporting members adapted to be secured to the sign, and a resilient biasing apparatus for interconnecting the base and sign-supporting members. The resilient biasing apparatus normally biases and supports the sign-supporting member and the sign in a generally upright position relative to the base, and includes at least one elastomeric member that is resiliently and torsionally deflectable, generally about a laterally-extending torsion axis. The elastomeric member thus allows the sign-supporting member and the sign to pivotally deflect relative to the base, from the generally upright position to a deflected position, in response to winds or other forces exerted on the sign-supporting member or the sign. It should be noted that the term "upright", as used herein refers not only to an upward-protruding vertical orientation, but also any other orientation that is "upright" relative to the base, such as horizontal, slanting or downward orientations, for example.

Preferably, the elastomeric member of the resilient biasing apparatus discussed above is compressively preloaded. Such compressive preloading greatly contributes to the durability and useful life of the sign stand assembly, as does the provision of a stop mechanism in the preferred embodiments, which limits the maximum torsional deflection of the elastomeric member to preselected maximum amounts of sign deflection.

In another embodiment of the invention, the elastomeric member discussed above is torsionally preloaded, with such torsional preloading being either in lieu of, or in conjunction with, the above-discussed compressive preloading. Specifically, in one such application, a pair of such elastomeric members are provided for allowing the sign to deflect as discussed above, with the elastomeric members being torsionally preloaded in opposite torsional or rotational directions. In such an arrangement, the elastomeric members act essentially "in parallel", with one of the members being torsionally unloaded while the other member is further torsionally loaded during low wind conditions. As the wind or other loads increase, however, both elastomeric members are torsionally loaded as the sign continues to deflect. This arrangement is believed to enhance the durability of the elastomeric members.

In still another embodiment, the resilient biasing apparatus includes a pair of elastomeric members acting essentially "in series". In this arrangement, one elastomeric member has a lower durometer hardness and a lower torsional spring rate than the other elastomeric member, and thus the resilient biasing apparatus provides for highly controlled performance in different wind conditions. The harder, higher durometer member, with the higher torsional spring rate, undergoes little or no torsional deflection and thus acts as a relatively rigid member in the face of low winds. As the magnitude of the winds or other forces increases, however, both elastomeric members deflect to prevent the upsetting of the sign and stand in higher winds. Thus, the sign does not deflect or flutter as much in lower wind conditions, and the usable lifetime of the resilient biasing apparatus is enhanced.

In a preferred embodiment of the present invention, which can also include any of the other features of the invention discussed herein, a single one-piece sign-supporting member is adapted for interconnection with, and protrudes in opposite directions from, the resilient biasing apparatus. This arrangement is especially preferred because of its economy and simplicity of manufacture.

The present invention thus enhances the ability of the sign and stand assembly to withstand wind or other forces, as well as withstanding the effects of the weather on coil springs. The invention also permits the use of one or more common designs to provide a wide variety of load-bearing capabilities for assemblies using common support members or other components. The present invention provides this feature through the use of deflectable elastomeric members whose size and deflection characteristics can be varied within the framework of relatively rigid outer sleeves or shells and inner sleeve, shaft or rod members having constant dimensions.

Additional objects, advantages and features of various embodiments of the present invention will become apparent from the following description and the appended claims, taken in conjunction with the accompanying drawings.

BRIEF DESCRIPTION OF THE DRAWINGS

FIG. 4 is an enlarged cross-sectional view taken generally along line 4—4 of FIG. 2, and illustrates in detail the resilient biasing apparatus of the sign stand assembly according to the present invention.

FIG. 5 is an enlarged partial front elevational view of the resilient biasing apparatus of another embodiment of the sign stand assembly invention.

FIG. 6 is a cross-sectional view taken generally along line 6—6 of FIG. 5.

FIG. 7 is a partial front elevational view, similar to that of FIG. 5, but illustrating still another embodiment of the present invention.

FIG. 8 is a cross-sectional view taken generally along line 8—8 of FIG. 7.

FIG. 13 is a partial front elevational view of still another alternate embodiment of the present invention, which is similar to that of FIG. 11, but with an alternate attachment arrangement.

FIG. 14 is a partial side elevational view of the sign and sign stand assembly of FIG. 13.

FIGS. 15A through 15C illustrate sequential stages in the making of a component of still another embodiment of the resilient biasing apparatus according to the present invention, which is shown in its completed form in FIGS. 16A through 17.

FIG. 16A is a partial side elevational view, illustrating the sign stand assembly of the embodiment of FIGS. 15A through 17, prior to the attachment of a sign.

FIG. 16B is a view similar to FIG. 16A, but illustrating the sign stand assembly after attachment of a sign.

FIG. 17 is a partial front elevational view similar to that of FIG. 4, but illustrating the embodiment of the present invention shown in FIGS. 15A through 16B, after attachment of the sign.

FIG. 18 is a partial front elevational view of one preferred form of the invention, in which the sign stand assembly includes a single one-piece sign-supporting member adapted for attachment of a sign thereto.

FIG. 19 is a cross-sectional view taken generally along line 19—19 of FIG. 18.

FIG. 20 is a perspective view of another sign or poster display device with a spring mounted base.

FIG. 21 is an enlarged side elevational view of a torsion spring of the embodiment of FIG. 20, showing the positioning of the mounting brackets in accordance with the present invention.

FIG. 22 is a cross-sectional view of the torsion spring taken generally along line 22—22 of FIG. 21.

FIG. 26 is a perspective view of another sign or poster display device with a modified form of torsion spring interconnecting means.

FIG. 27 is an enlarged side elevational view of a torsion spring shown in FIG. 26, with the modified interconnecting means partly in cross-section to illustrate the end portion thereof.

DETAILED DESCRIPTION OF THE PREFERRED EMBODIMENT

Figure 1:
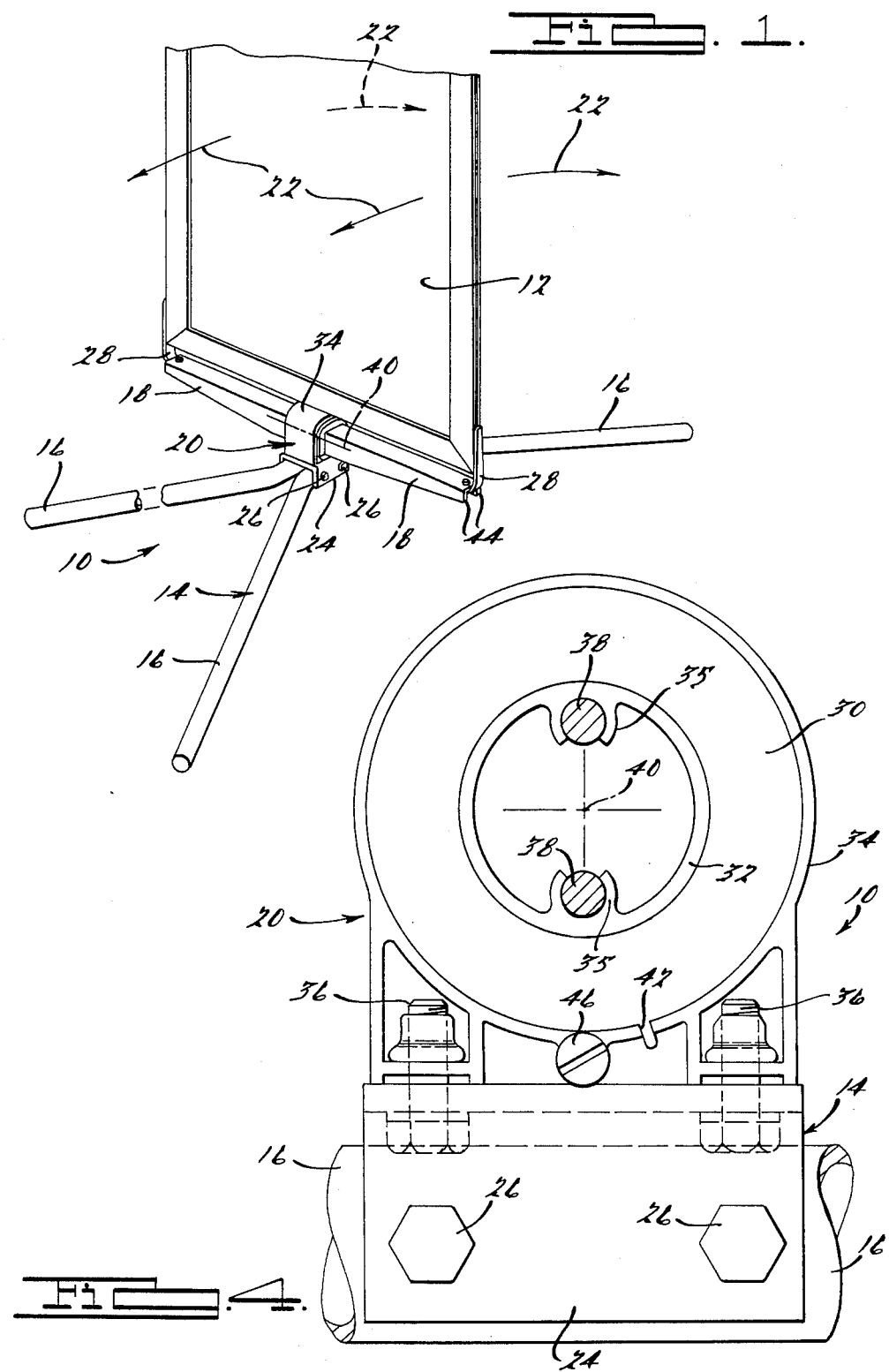
FIG. 1 is a partial perspective view showing an exemplary sign stand assembly according to the present invention for supporting a sign in a generally upright orientation relative to the base of the sign stand assembly.

FIGS. 1 through 29 illustrate various exemplary embodiments of a sign stand assembly according to the present invention. One skilled in the art will readily recognize from the following discussion, taken in conjunction with the accompanying drawings and claims, that the present invention is not limited to the sign-supporting embodiments shown for purposes of illustration in the drawings, and that the present invention also finds applicability in devices other than sign stand assemblies.

In FIG. 1, a sign stand assembly 10 according to the present invention is illustrated for supporting a sign 12 in a generally upright orientation relative to a base 14 having one or more legs 16 for engaging the ground or other underlying surface. The sign stand assembly 10 also includes one or more sign-supporting members 18 adapted for supporting attachment to the sign 12, and a resilient biasing apparatus 20 for permitting the sign 12 to pivotally deflect relative to the base 14 from its generally upright orientation, as indicated by the arrows 22 shown in FIGS. 1 and 3.

As shown in FIGS. 1 through 4, the base 14 includes a base bracket 24, to which the legs 16 are preferably attached by fasteners or pins 26. The base bracket 24 can be any of a number of various types of structures known to those skilled in the art and is interconnected with the sign-supporting members 18 by the resilient biasing apparatus 20 as discussed in more detail below. It should be noted that one skilled in the art will readily recognize that the base assemblies of the various embodiments discussed herein can alternately include apparatus for attachment to a wall, a column or post, or other structures.

Figure 2:
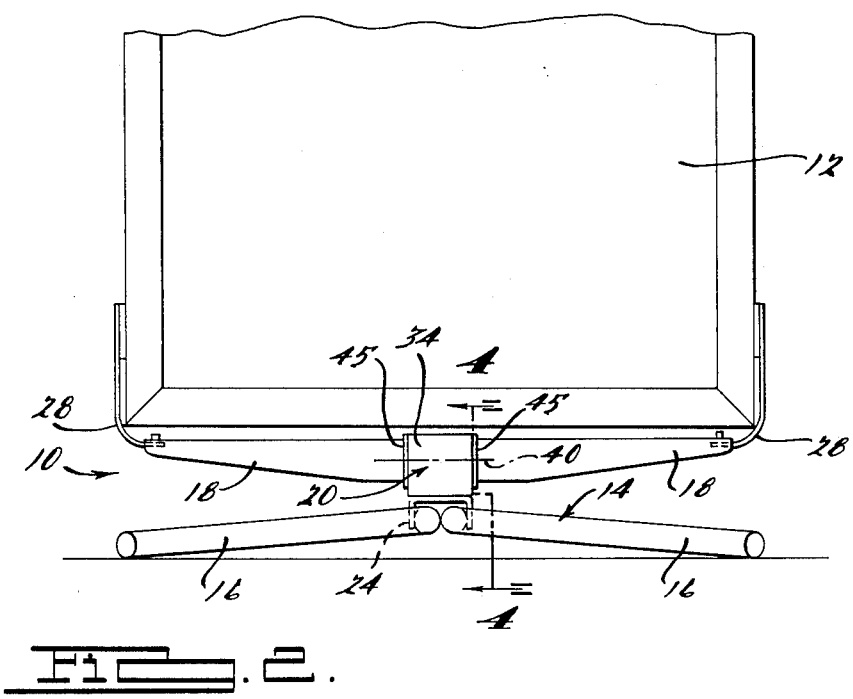
FIG. 2 is a partial elevational view of a sign and sign stand assembly, illustrating one of the preferred embodiments of the present invention.
Figure 3:
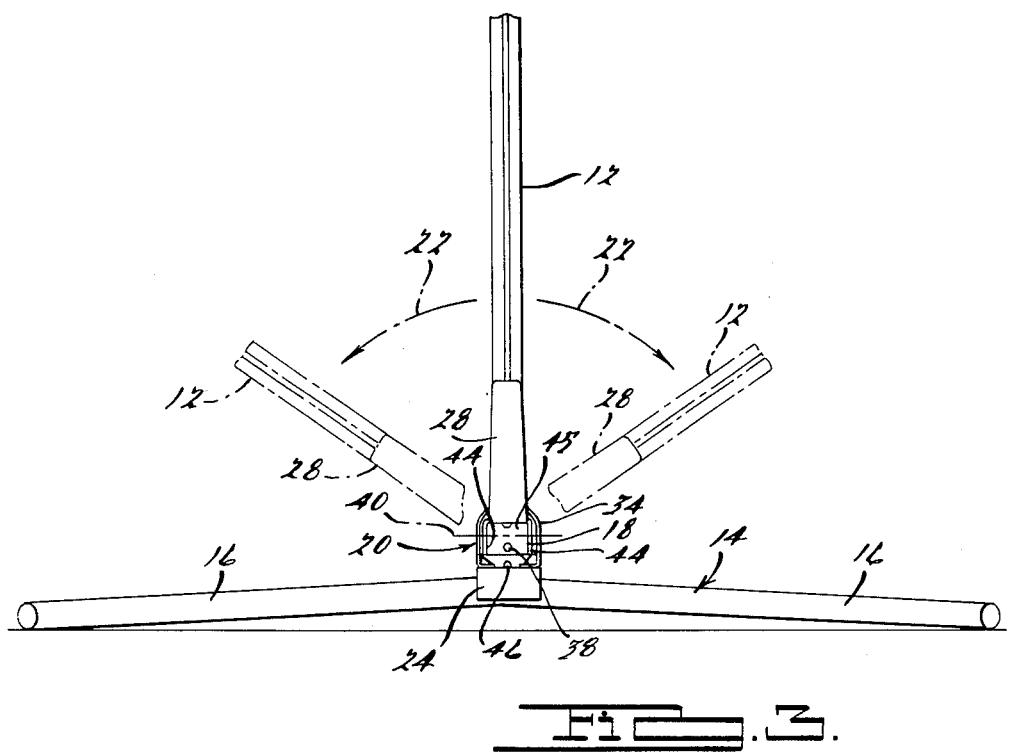
FIG. 3 is a partial side view of the sign and sign stand assembly of FIG. 2.

The sign-supporting member or members 18 are adapted to be secured to the sign 12 by any of a number of suitable attachment mechanisms known to those skilled in the art, such as by way of a pair of attachment brackets 28, shown for purposes of illustration in FIGS. 1 through 4. Preferably, the sign-supporting members 18 are each generally U-shaped in lateral cross-section and include a pair of downwardly-depending legs 44 and an attachment plate 45, as shown in FIGS. 2 and 3.

The resilient biasing apparatus 20 includes an elastomeric member 30, which is preferably of a hollow cylindrical configuration, with its inner peripheral surface fixedly secured or bonded to an inner sleeve or rod 32, and with its outer peripheral surface fixedly secured or bonded to an outer sleeve 34. The inner sleeve 32 is shown for purposes of illustration as a generally hollow cylindrical configuration, but can alternately be a solid member having any suitable cross-sectional shape, depending upon the cross-sectional shape of the inner peripheral surface of the elastomeric member 30. The elastomeric member 30 and the other elastomeric members described below can be of a vulcanized rubber or other elastomeric polymer composition having suitable durometer hardnesses, spring rates, and other properties, all of which are now determinable by one skilled in the art in a given application.

The inner sleeve 32 is preferably secured to the attachment plates 45 of the sign-supporting members 18 by one or more fasteners 38 threadably enaging bosses 35, for example. Similarly, the outer sleeve 34 is secured to the base bracket 24 in any of a number of ways known to those skilled in the art, such as by way of one or more fasteners 36. Once assembled, the resilient biasing apparatus 20 resiliently biases the sign 12 in the above-mentioned generally upright orientation, but permits deflection of the sign 12 about a generally laterally-extending torsion axis 40 in pivotal directions indicated by arrows 22 in FIGS. 1 and 3.

In order to enhance the durability of the elastomeric member 30, under cyclic wind loads, the elastomeric member 30 is preferably compressively preloaded in a generally radially inward direction relative to the torsion axis 40, as well as axially along the torsion axis 40 and in other directions. Such preloading of the elastomeric member 30 is preferably accomplished after it is bonded to the inner and outer sleeves 32 and 34, during mounting of the resilient biasing apparatus 20. The outer sleeve 34 includes a split portion 42 of the outer sleeve 34, which extends along the axial length of the outer sleeve 34 and allows the outer sleeve 34 to be deflected or tightened in a circumferential direction (through an arc of approximately one to three degrees) to the position shown in FIG. 4, when the outer sleeve 34 is secured to the base bracket 24 by way of the fasteners 36. This is accomplished by first securing one side of the outer sleeve 34 to the base 14 and then rotating the other side of the outer sleeve 34 to the position shown in solid lines in FIG. 4 in order to compress the elastomeric member 30 between the inner sleeve 32 and the tightened outer sleeve 34.

In order to limit the amount of pivotal deflection of the sign 12, and to avoid overstressing the elastomeric member 30, the torsional deflection of the elastomeric 30 is preferably limited by way of a stop member 46, which can be fixed to the outer sleeve 40. The stop member 46 protrudes axially from the outer sleeve 34 and is disposed so as to interferingly engage either one of the legs 44 or the attachment plate 45 of the U-shaped sign-supporting member 18 when the elastomeric member 30 torsionally deflects a predetermined amount corresponding to a preselected maximum deflection of the sign 12 in the direction of the arrows 22.

It has been determined that a preferred maximum amount of torsional deflection of the elastomeric member 30 corresponds to a rotation of the inner sleeve 32 about the torsion axis 40 of approximately 45 degrees in either of the opposite pivotal directions indicated by the arrows 22, which is crucial to the long life and durability of elastomeric member 30 in order to avoid overstressing the elastomer in this cyclically loaded application. This corresponds to a preferred maximum pivotal deflection of the sign 12 of approximately 55 degrees in either of the pivotal directions indicated by the arrows 22, with the ten-degree difference between the deflection of the elastomeric member 30 and the sign 12 being due to the inherent resiliency of the assembled components of the sign stand assembly 10 other than the elastomeric member 30. This amount of deflection has also been found to result in a change in the vector forces on the sign and stand such that the sign and stand is more stable and less susceptible to tipping over in high winds.

The above-discussed preferred maximum pivotal deflectability of 55 degrees for the sign 12, which corresponds to a preferred maximum torsional deflection of 45 degrees in either direction for the elastomeric member 30, has been determined to provide good readability and reflectiveness of the sign 12, while still avoiding the tendency of the sign and sign stand to tip over in high winds, such as in winds up to approximately 100 miles per hour. Such a determination was made using a prototype sign and sign stand having legs engaging the ground or other underlying surface at points approximately 24 inches in a lateral direction from a vertical plane passing through the torsion axis 40, with the sign and sign stand assembly having an overall height of 52 inches above the ground. In tests of this prototype, the above-mentioned 45 degree deflection of the elastomeric member 30 occurred in response to a force of approximately 38 to 40 pounds directed along an effective vector approximately 36 inches above the ground or other supporting surface. Preferably, the above-mentioned maximum pivotal deflections can be advantageously used in any of the embodiments of the present invention shown and discussed herein.

FIGS. 5 and 6 illustrate another embodiment of the present invention, which is generally similar to that shown in FIGS. 1 through 4, except for the provision of an alternate stop member, which can be employed in lieu of the stop member 46 in virtually any of the embodiments discussed herein. In FIGS. 5 and 6, most of the components of a sign stand assembly 110 are identical or correspondingly similar to the various components of the sign stand assembly 10 shown in FIGS. 1 through 4. Such identical or correspondingly similar components of the sign stand assembly 110 are thus indicated by reference numerals corresponding to those of the sign stand assembly 10 in FIGS. 1 through 4, but having a one-hundred "prefix".

In FIGS. 5 and 6, a stop member 146 is substituted for the stop member 46 of sign stand assembly 10 and includes a mounting plate 148 and a triangular portion 150. Preferably, the mounting plates 148 are adapted to be secured to the base bracket 124, with the triangular portions 150 protruding in an offset relationship therefrom so as to be disposed for interfering engagement with either the legs 144 or the attachment plates 145 of the sign-supporting members 118 upon torsional deflection of the elastomeric member 130 to the above-discussed predetermined maximum pivotal or rotational positions relative to the torsion axis 140. In other respects, the function of sign stand assembly 110 is substantially the same as that of the sign stand assembly 10 in FIGS. 1 through 4.

In FIGS. 7 and 8, still another alternate embodiment of the present invention is illustrated, wherein a sign stand assembly 210 is generally similar to the sign stand assemblies 10 and 110, shown in FIGS. 1 through 4 and in FIGS. 5 and 6, respectively. Thus, corresponding or similar elements are identified by corresponding reference numerals having a two-hundred "prefix".

Instead of the inner sleeve member 32 or 132 discussed above, the sign stand assembly 210 includes a hex-shaped sleeve or rod member 238, which extends axially through, and is interlocked for rotation with, an inner sleeve member 232. In turn, the inner sleeve member 232 has a corresponding hex-shaped opening 249 extending axially therethrough for receiving, and rotationally interlocking with, the hex-shaped member 238. The hex-shaped member 238 is preferably fixably secured at one end to at least one of the attachment plates 245 of the sign-supporting members 218, such as by welding as indicated for purposes of illustration at reference numeral 247 in FIG. 7, with the opposite end either extending through a hex-shaped opening 251 in the other attachment plate 245 or secured thereto.

It should be noted that although the stop member 246 shown in FIGS. 7 and 8 corresponds to the stop member 146 shown in FIGS. 5 and 6, the stop member 46 of the sign stand assembly 10 shown in FIGS. 1 through 4 may alternately be used in conjunction with the sign stand assembly 210 shown in FIGS. 7 and 8 or with other embodiments of the present invention. It should also be noted that the hex-shaped cross-section of the member 238 and the openings 249 and 251 can alternately be configured with other polygonal shapes that provide complementary interfering rotational restraint with one another.

Figures 9, 10:
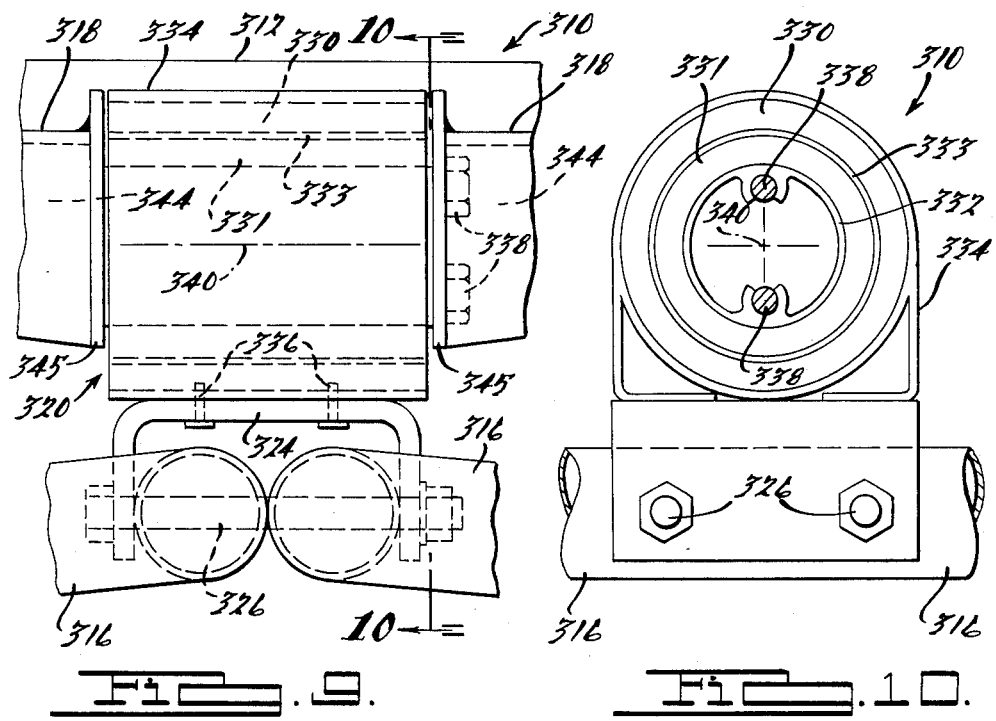
FIG. 9 is a partial front elevational view similar to that of FIGS. 5 and 7, but illustrating still another embodiment of the present invention.
FIG. 10 is a cross-sectional view taken generally along the line 10—10 of FIG. 9.

FIGS. 9 and 10 illustrate another alternate embodiment of the present invention, wherein a sign and stand assembly 310 is generally similar to the sign and stand assemblies of the embodiments illustrated in the previous Figures. Thus the identical or correspondingly similar components of the sign and stand assembly 310 are indicated by reference numerals corresponding to those discussed above, except that a three-hundred "prefix" is used.

In the sign and stand assembly 310, a pair of elastomeric members 330 and 331 are provided in the resilient biasing apparatus 320, with the outer elastomeric member 330 being fixedly secured or bonded to the inner periphery of an outer sleeve member 334 and generally surrounding an intermediate sleeve member 333, an inner elastomeric member 331, and an inner sleeve member 332. The inner elastomeric member 331 is fixedly secured or bonded to both the inner sleeve member 332 and the intermediate sleeve member 333, which is in turn fixedly secured or bonded to the outer sleeve member 334.

Preferably, the outer elastomeric member 330 is composed of an elastomeric material that has a softer durometer hardness, and thus a lower torsional spring rate, than that of the inner elastomeric member 331. The inner and outer elastomeric members 331 and 330, respectively, essentially act "in series" with one another in that the inner elastomeric member 331 with the higher torsional spring rate undergoes little or no torsional deflection under low or moderate wind conditions. As the magnitude of the winds or other forces exerted on the sign 312 and sign stand assembly 320 increases, both of the elastomeric members 330 and 331 deflect in order to substantially prevent the sign and sign stand assembly from tipping over. By such an arrangement, the sign does not deflect as much in lower wind conditions, and the durability of the resilient biasing apparatus 320 is enhanced, all without substantially affecting the "wind-proof" performance of the sign stand assembly.

Although for purposes of clarity of illustration no stop mechanism or stop member is shown in FIGS. 9 and 10, the sign stand assembly 310 can preferably include either the stop member 46 shown in FIGS. 1 through 4, or the stop member 146 shown in FIGS. 5 and 6, both of which are discussed above. Furthermore, it should be emphasized that although the softer (lower torsional spring rate) elastomeric member 330 is disposed radially outward from the harder (higher torsional spring rate) elastomeric member 331 in FIGS. 9 and 10, one skilled in the art will readily recognize that this radial orientation can alternately be reversed, with the inner elastomeric member being softer and having a lower spring rate than the outer elastomeric member.

Figures 11, 12:
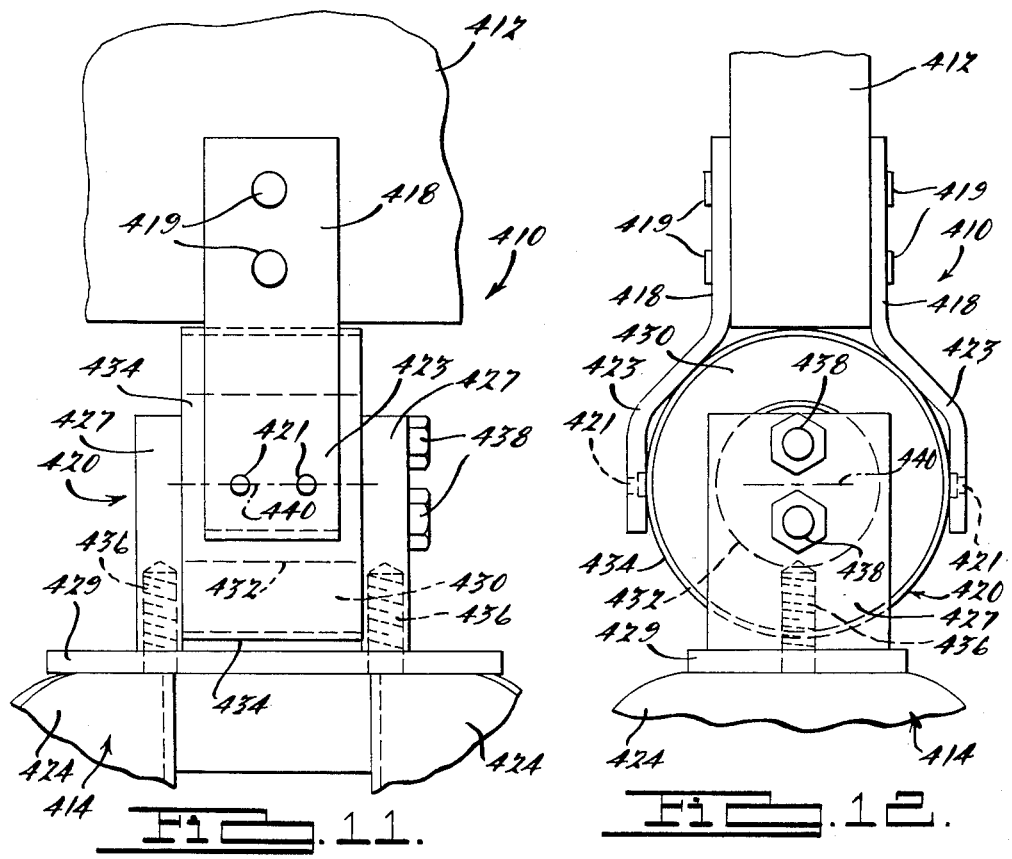
FIG. 11 is a partial front elevational view of a further alternate embodiment of the present invention.
FIG. 12 is a partial side elevational view of the sign and sign stand assembly of FIG. 11.

In FIGS. 11 and 12, another alternate sign stand assembly 410 is generally similar to that shown in FIGS. 1 through 8, and thus corresponding elements of the sign stand assembly 410 are identified by reference numerals with four-hundred "prefixes". The sign 412 in FIGS. 11 and 12, however, is interconnected with the outer sleeve member 434, and the base 414 is interconnected with the inner sleeve member 432. In this arrangement, the sign-supporting member or members 418 can be secured directly to the sign 412, as shown in FIGS. 11 and 12, and include laterally spaced leg portions 423 secured by any suitable means to the outer sleeve member 434, such as by fasteners 421, for example. The base 414 includes any of a number of suitable leg-attaching members 424, preferably that allow the legs 418 to be folded up, and that can be secured to the inner sleeve member 432 by way of an attachment plate 429, attachment brackets 427, and fasteners 438, for example.

In the alternate arrangement shown in FIGS. 11 and 12, which is "reversed"relative to those discussed above, the resilient biasing apparatus 420 functions in a manner generally similar to that described above in connection with the embodiments shown in FIGS. 1 through 8, with the arrangement of the sign stand assembly 410 perhaps being more suitable for some types of sign configurations, or for interconnecting a sign post or other vertical sign component with the resilient biasing apparatus 420. It should also be noted that the resilient biasing apparatus 420, like that of the other embodiments discussed herein, can alternately include the dual-durometer, double elastomeric member arrangement discussed above in connection with FIGS. 9 and 10.

Still another alternate embodiment of the present invention is illustrated in FIGS. 13 and 14, wherein a sign stand assembly 510 is generally similar to the sign stand assembly 410 of FIGS. 11 and 12, except that the base 514 is interconnected with the resilient biasing apparatus 520 by way of a hex-shaped sleeve or rod member 538, generally similar to the hex-shaped member 238 shown in FIGS. 7 and 8. In order to rotationally restrain the hex-shaped member 538 to the attachment brackets 527, set screws 552 or other suitable fasteners are threadably received in threaded openings 53 in the attachment brackets 527. In turn, the hex-shaped member 538 is rotationally restrained by, and received in, a hex-shaped opening 549 in the inner sleeve 532.

It should be noted, that like the embodiment discussed above in connection with FIGS. 7 and 8, the hex-shaped member 238, and the hex-shaped openings 249 and 251 can alternately be configured with other complementary polygonal shapes for interfering rotational restraint with respect to one another.

FIGS. 15A through 17 illustrate still another embodiment of the present invention, in which a resilient biasing apparatus includes a pair of elastomeric members acting essentially "in parallel" with one another and torsionally preloaded in opposite torsional, circumferential directions with respect to one another. As above, elements shown in FIGS. 15A through 17 that are similar or that correspond to those of other embodiments are indicated by corresponding reference numerals having six-hundred "prefixes".

FIGS. 15A through 15C illustrate the major sequential steps in making a portion of the resilient biasing apparatus 620 shown in FIGS. 16A through 17 in connection with an alternate sign stand assembly 610. FIG. 15A, an inner sleeve member 632, with mounting bosses 635 thereon, is fixedly secured or bonded to the inner surface of a generally cylindrical elastomeric member 630, which in turn has its outer peripheral surface fixedly secured or bonded to an outer sleeve member 634. This composite assembly is essentially similar to the inner sleeve member 32, the elastomeric member 30, and the outer sleeve member 34 shown in FIGS. 1 through 4, with the exception that the outer sleeve member 634 is provided with a pair axially-spaced tabs 660 on one radial side, as shown in FIG. 15A, and a pair of similar axially-spaced tabs 661 on its outer periphery on the opposite radial side of the outer sleeve member 634. The tabs 661 are not visible in FIGS. 15A and 15B, but their function will become apparent from the discussion below in connection with FIG. 15C.

As shown in FIG. 15B, the subassembly of FIG. 15A is cut or otherwise separated or severed along on axially intermediate, radially-extending plane that is radially perpendicular to the axial centerline or torsional axis 640 of the composite assembly. This operation forms two separate composite subassemblies, one having an outer sleeve member 634A, an elastomeric member 630a, and an inner sleeve member 632a, with the other composite subassembly having an outer sleeve 634b, an elastomeric member 630b, and an inner sleeve member 632b. It is important to note that the bosses 635a and 635b in FIG. 15B are still circumferentially oriented at the same angle 670 (preferably approximately 10 degrees) with respect to a vertical plane 641 extending through the centerline or torsional axis 640 as they were in FIG. 15A before the composite assembly was severed.

In FIG. 15C, one of the halves of the severed composite subassembly has been rotated end-for-end such that its free end is now adjacent the severed end of the other composite subassembly. This results in the bosses 635a lying along a line at the angle 670 in the opposite direction from the vertical plane 641 extending through the centerline or torsional axis 640. In FIG. 15C, therefore, one of the tabs 661a that was previously on the opposite side of the outer sleeve member 634a (and not visible in FIGS. 15 and 15B) is now visible in FIG. 15C, due to the end-for-end rotation of the outer sleeve member 634a and its associated components.

In FIG. 16A, the severed half-subassemblies shown in FIGS. 15A through 15C have been repositioned end-to-end (as shown in FIG. 15C) and mounted onto the base 614 in a manner similar to that discussed above in connection with FIGS. 1 through 4. As can be readily seen in FIG. 16A, however, the bosses 635a on the inner sleeve 632a are circumferentially misaligned with respect to the bosses 636b on the inner sleeve 632b, with each of the pairs of bosses 635a and 635b, respectively, being circumferentially offset relative to the vertical plane 641 passing through the centerline or torsional axis 640 in opposite circumferential directions at the previously-mentioned angle 670.

As shown in FIG. 16B, however, after the sign-supporting members 618 (shown in FIG. 17) are attached to the sign 612 and to the inner sleeve members 632a and 632b by way of the fasteners 638 and the attachment plates 645 shown in FIG. 17, the respective pairs of bosses 635a and 635b are rotated circumferentially toward one another through the angles 670 to be substantially aligned with the vertical plane 641 and with each other. Such circumferential rotation relative to the fixed outer cylinder 634a and 634b, as well as the mounting clamp 664, torsionally preloads the elastomeric member 630a and 630b in opposite circumferential directions toward one another.

As discussed above, such torsional preloading of the composite subassemblies shown in FIGS. 15A through 15C allows the respective elastomeric members 630a and 630b to torsionally deflect and function "in parallel" with respect to one another. This arrangement results in one of the elastomeric members 630a and 630b being torsionally unloaded while the other elastomeric member is further torsionally loaded in low to moderate wind conditions. As the magnitude of the wind forces increases, however, both of the elastomeric members 630a and 630b are torsionally deflected up to the maximum predetermined amounts of torsional deflection discussed above.

FIGS. 16A through 17 best show the arrangement by which the outer sleeve 634a and 634b are rotationally restrained with respect to the mounting clamp 664. The radially-protruding tabs 660a and 660b and the opposite tabs 661a and 661b are interlockingly received within slots 666 on opposite sides of the mounting clamp 664. Furthermore, as the mounting clamp 664 is fixedly secured to the base bracket 624 by way of the fasteners 636, the elastomeric members 630a and 630b can be compressively preloaded, as discussed above, in connection with FIGS. 1 through 4, due to the axially-extending slits 642a and 642b. Furthermore, although no stop member is shown in FIGS. 16A through 17 for purposes of clarity of illustration, stop member arrangements similar to those shown in FIGS. 1 through 4 or FIGS. 5 and 6 are preferably included in the sign stand assembly 610 for purposes of limiting the maximum torsional deflection of the elastomeric member 630a and 630b to correspond with preselected maximum sign deflection of the sign 612.

FIGS. 18 and 19 illustrate a preferred form of the present invention, which is similar in many respects to the embodiments of the invention discussed above, and therefore similar or corresponding elements are identified with reference numerals having seven-hundred "prefixes".

The sign stand assembly 710 shown in FIGS. 18 and 19 includes a single, one-piece sign-supporting member 718 having a preferred, generally U-shaped cross-section with downwardly-depending legs 744. The one-piece sign-supporting member 718 is fixedly secured to a modified form of an outer sleeve member 734, such as by the fasteners 736. The outer sleeve member 734 is fixedly secured or bonded to the elastomeric member 730, which is in turn fixedly secured or bonded to the inner sleeve member 732. Similarly, the inner sleeve member 732 is fixedly secured to the base brackets 724 of the base assembly 714.

Preferably, the base brackets 724 are configured such that their sides 725 interferingly engage the legs 744 of the sign-supporting member 718 upon torsional deflection of the elastomeric member 730 in order to limit such torsional deflection to the predetermined amounts discussed above. Alternately, stop members similar to the stop members 46 or 146 (as discussed above) can be used for this purpose.

The arrangement of FIGS. 18 and 19 is especially preferred in suitable applications because of the simplicity and economy of manufacture and assembly resulting from the one-piece design of the sign-supporting member 718. One skilled in the art will readily recognize that the embodiment shown in FIGS. 18 and 19 can alternately be easily modified in order to reverse the arrangement shown such that the one-piece sign-supporting member 718 is interconnected with the inner sleeve member 732 (such as by suitable attachment plates between the legs 744), with the base 714 being interconnected with the outer sleeve member 734 similar to the arrangements shown in the other drawing figures.

Referring to FIGS. 20 through 29 of the drawings, werein like reference numerals refer to like parts throughout the several views of still further embodiments of the present invention, there is shown in FIG. 20 a poster display device or means 810 having an upstanding frame structure with a suitable downwardly extending support or support bar 811 which may be rectangular or tubular. Such means 810 is a frame structure, however, in the example described as shown as a display device that is adapted to have mounted thereon an advertising sign, poster, or the like.

Such poster display device is mounted on a base which has a U-shaped bracket 813 having a pair of vertically disposed plates 814 and a bottom plate 815 interconnecting such vertically disposed plates 814. Such plates may be a single U-shaped member. A plurality of horizontally extending legs 816 are suitably connected to the bottom plate 815 in a manner well known in the art to provide ground engaging means.

A torsion spring 820 shown in FIGS. 21 and 22 has a cylindrical shaft member or sleeve 821 with a keyway 822 extending therethrough along its inner bore 823. Mounted within bore 823 is an elongated shaft 825 having a keyway therein for receiving a key 26 (FIG. 22) to secure the shaft 825 and the torsion spring 820 together. The respective ends of the shaft 825 are secured to the vertically disposed plates 814 as by independent keys or other suitable means.

A generally cylindrical housing member or shell 830 has a pair of outwardly extending legs or leg members 831 and 832 for attaching the torsion spring to the poster display device in a manner to be described. The cylindrical housing member 830 is a circumferential shell with a gap 834 formed along its upper circumference between the respective leg members 831 and 832. The respective leg members each have a pair of aligned bolt holes.

A rubber sleeve or annulus of elastomeric material 835, the spring element in the torsion spring, is molded and vulcanized in the space between the shaft member or sleeve 821 and the cylindrical housing member 830, preferably with the use of a suitable rubber-to-metal adhesive and under compression. During the molding process, the rubber fills the entire space between the sleeve 821 and the housing member or shell 830 and is bonded firmly thereto.

After attaching the respective ends of the shaft 825 to the end brackets or vertically disposed plates 814, the depending support bar 811 of the poster display device is slid down between leg members 831 and 832 such that the aligned bolt holes in such leg members 831 and 832 are also aligned with bores 836 and 838 in the support bar 811 to facilitate the reception of bolts 839 and 840 to interconnect the torsion spring to the poster display device 810. Such housing 830 in its split form as part of the torsion spring itself also functions as a clamp for attachment to other fixtures to facilitate its action as part of the torsion spring. Such split outer shell or housing helps to relieve shrinkage stress of the rubber spring sleeve 835 and permits controlled compression of the rubber for greater fatigue life.

In the operation of the poster display device 810, such device 810 will be biased by the torsion spring into an upright position. The depending bar 811 of the poster device is clamped by the leg members 831 and 832 of the torsion spring 820 and as an external force is exerted on the poster display device 810, the display device will deflect as shown in phantom lines in FIG. 21 to exert a torsion in the rubber of sleeve 835 whose radial innermost surface is held against rotation by the sleeve 821 and its keyed connection to shaft 825. Whenever the external forces are relieved, the torsion spring will return the poster display device 810 to its normal vertical position.

Figure 23:
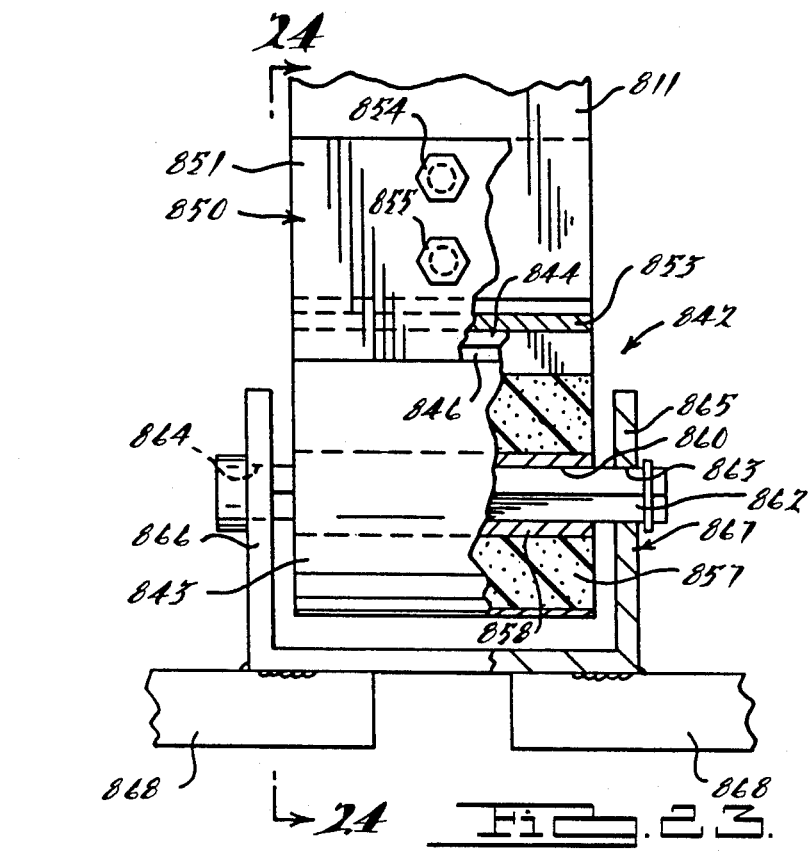
FIG. 23 is a front elevational view of another modified embodiment of a torsion spring with the mounting bracket and with a portion thereof broken away to show the torsion spring in cross-section.
Figure 24:
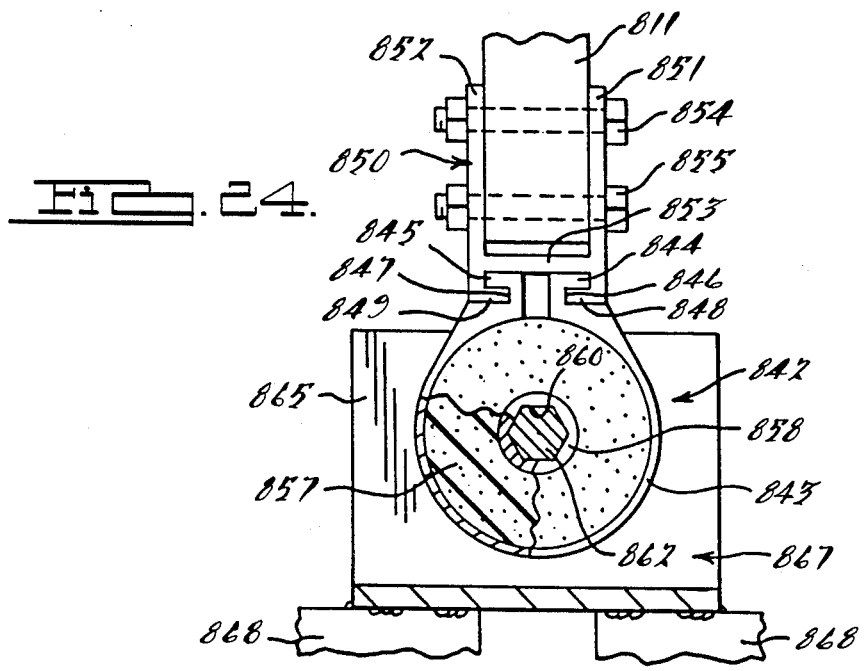
FIG. 24 is a side elevational view of the modified embodiment of the torsion spring and mounting bracket of FIG. 23.

A modification of the above described device is shown in FIGS. 23 and 24, with the torsion spring designated by reference numeral 842. Torsion spring 842 has a cylindrical housing or outer shell 843 with a pair of outwardly extending leg members 844 and 845. In this embodiment, such leg members 844 and 845 are much shorter in length than the initial described embodiment of leg members 831 and 831. Such leg members 844 and 845 are recessed as at 846 and 847 to receive a pair of connecting links 848 and 849 of an attaching bracket 850. Bracket 850 has a pair of vertically disposed side plates 851 and 852 interconnected by a horizontally extending portion 853. Bracket 850 is slid into position when leg members 844 and 845 of shell 843 are moved toward each other permitting the sliding of such connecting links 848 and 849 into the recessed portions 846 and 847 of leg members 844 and 845.

The respective plates 851 and 852 have pairs of vertically spaced bores for alignment with bores in the support bar 811 and receive bolts 854 and 855 to secure the poster display device 810 and its support bar 811 to the torsion spring 842.

The shell 843 of the torsion spring 842 has its inner surface bonded to an elastomeric or rubber sleeve 857 similar to rubber sleeve 835, which sleeve 857 in turn has its inner circumferentially extending surface bonded to an inner metallic sleeve 858. Inner sleeve 858 has an outer circular surface and an inner non-linear perimeter that defines a polygonal aperture 860. A shaft 862 that is hexagonal in cross-section is frictionally received by aperture 860 and hexagonal apertures 863 and 864 in side plates 865 and 866 of a U-shaped bracket 867. Shaft 862 is thus connected to the side plates 865 and 866. Such shaft 862 may be keyed to the side plates 865 and 866 or connected thereto in other manners to prevent axial movement of shaft 862. Bracket 867 has a plurality of ground engaging leg members 868 suitably connected thereto.

Once the torsion spring 842 with the leg members 844 and 845 are connected to the attaching bracket 850, the manner of attachment to the support bar 811 is similar to the first described embodiment. With the rubber component such as sleeve 857 of the torsion spring being in compression, the fatigue life of such rubber sleeve component will be increased materially.

Figure 25:
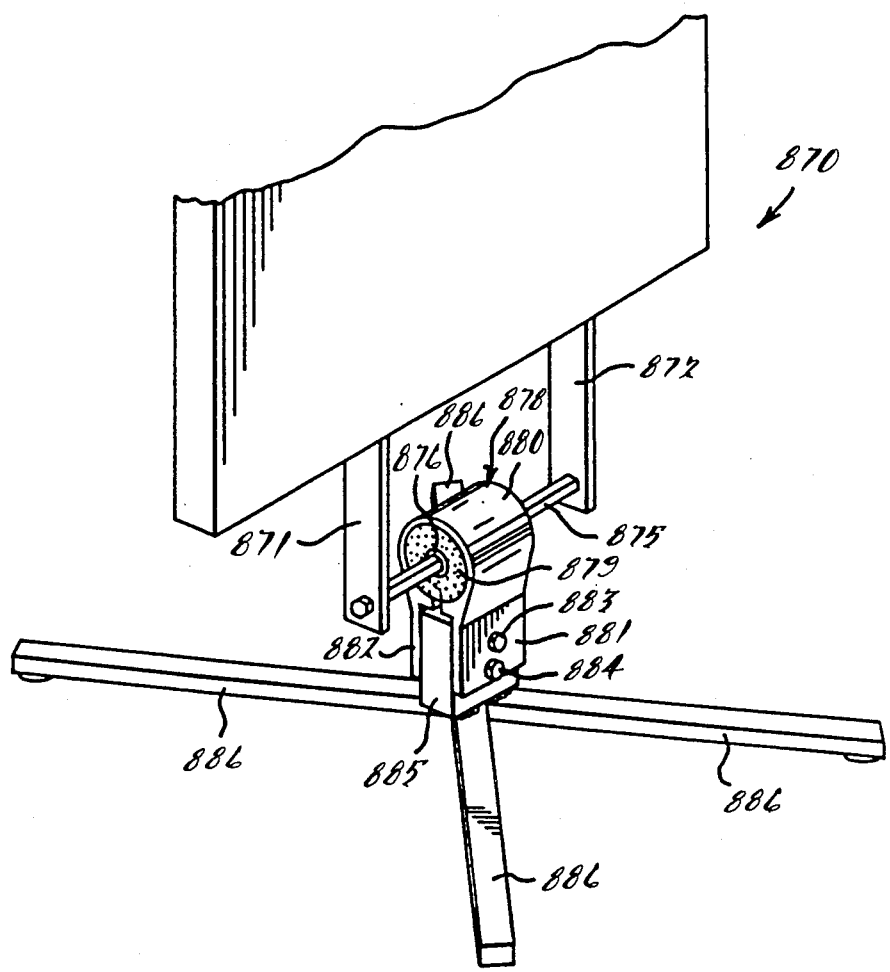
FIG. 25 is a perspective view of still a further modified embodiment of the invention showing a torsion spring interconnecting the base to a sign or poster display device.
Figure 28:
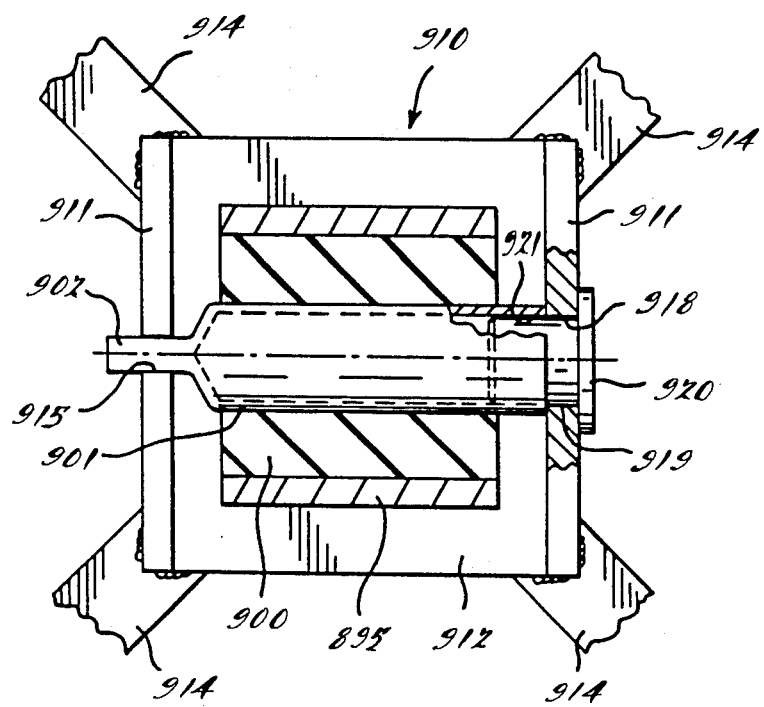
FIG. 28 is a cross-sectional view of the torsion spring and support taken generally along line 28—28 of FIG. 27, showing the spring in a plan view.
Figure 29:
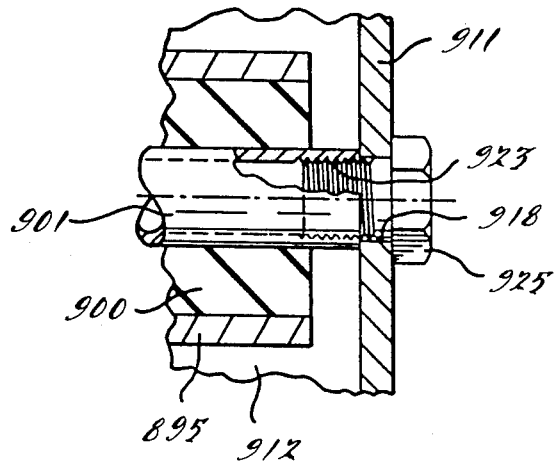
FIG. 29 is a fragmentary plan view, partly in cross-section, of a modified form of the end portion of a torsion spring shown in FIG. 28.

A further modified embodiment of the invention is shown in FIG. 25 wherein a poster display device or means 870 is suitably connected to a pair of depending brackets 871 and 872 forming a support frame. Such brackets 871 and 872 have a pair of aligned polygonal apertures that receive a shaft 875 that is polygonal in cross-section. Shaft 875 is frictionally received by the inner polygonal bore of sleeve 876 of a torsion spring 878. The cylindrical outer surface of sleeve 876 is bonded to a rubber sleeve or annulus of elastomeric material 879, the spring element in the torsion spring 878. The outer surface of rubber sleeve 879 is bonded to the inner cylindrical surface of a housing member or shell 880 which has a gap formed along its lower circumference as shown in FIG. 25, similar to the above-described embodiments. Such rubber sleeve 879 is molded and vulcanized in the space between the sleeve 876 and the cylindrical housing member or shell 880 preferably with the use of a suitable rubber-to-metal adhesive and under compression. During such molding process, the rubber fills the entire space between the sleeve 876 and the shell 880 and is firmly bonded thereto.

The outer shell 880 has a pair of outwardly extending legs or leg members 881 and 882 for attaching the torsion spring to an upwardly extending bracket 885 which has a plurality of ground engaging supports 886 suitably connected thereto. Bracket 885 has a pair of vertically aligned bores which are adapted to register with bores in leg members 881 and 882 to receive bolts 883 and 884 for connecting these members together while operative to exert a compressive force on the rubber sleeve 879 to thereby materially increase the fatigue life of the rubber component.

A further modification of the above described embodiments is shown in FIGS. 26 through 29 wherein a poster display device 890 is suitably connected to a depending bracket 891 forming a support frame. Such bracket 891 is connected to a pair of spaced outwardly extending leg members 892 and 893 of an outer shell 895. The respective leg members 892 and 893 have suitable apertures aligned with apertures 896 and 897 in bracket 891 to facilitate the reception of bolts 898 for interconnecting such leg members to the bracket 891. An annular elastomeric member 900 has its outer surface suitably bonded to the inner peripheral surface of outer shell 895 similar to the prior described embodiments.

The inner circumferentially extending surface of the elastomeric annular member 900 is suitably bonded to the outer surface of a tubular metal sleeve 901, which sleeve 901 has a flattened extension 902.

Such above described torsion spring is mounted in a base which has a U-shaped bracket 910 having a pair of vertically disposed plates 911 and a bottom plate 912 interconnecting such vertically disposed plates 911. Such plates may be a single U-shaped member. A plurality of horizontally extending legs 914 are suitably connected to the bottom plate 912 as by welding. The one vertical plate 911 of bracket 910 has a slot 915 to receive the flattened extension 902 of sleeve 901. The other vertical plate 911 of bracket 910 has an aperture 918 to receive the cylindrical portion 919 of plug 920. The outer end portion of plug 920 is frictionally received by the end bore 921 of tubular sleeve 901 that is opposite the flattened extension 902 of such sleeve 901 to retain the torsion spring on the U-shaped bracket 910 of the base. In lieu of the friction fit, the end portion of the bore 921 may be threaded as at 923 to receive a threaded plug 925 which facilitates the interconnection of the torsion spring onto the base. Such elastomeric member 900 is molded and vulcanized in the space between the sleeve 901 and the outer shell 895 which has a gap formed along its leg members 892 and 893. Such elastomeric sleeve 900 is molded and vulcanized in the space between the sleeve 901 and the outer shell 895 preferably with the use of a suitable rubber-to-metal adhesive and under compression. During such molding process, the elastomeric material fills the entire space between the sleeve 901 and the shell 895 and is firmly bonded thereto.

The foregoing discussion discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

We claim:

1. A sign stand assembly for supporting a sign, said sign stand assembly comprising: a base; at least one sign-supporting member securable to the sign; and resilient biasing means interconnecting said base and said sign-supporting member for normally biasingly supporting said sign-supporting member in a generally upright position relative to said base, said resilient biasing means including at least one elastomeric member resiliently and torsionally deflectable about a torsion axis for allowing said sign-supporting member to pivotally deflect relative to said base from said generally upright position in response to predetermined forces exerted on said sign-supporting member, and said sign stand assembly further including means for compressively preloading said elastomeric member.

2. A sign stand assembly according to claim 1, wherein said sign stand assembly further includes means for torsionally preloading said elastomeric member in a circumferential direction relative to said torsion axis.

3. A sign stand assembly according to claim 1, further including stop means for limiting the torsional deflection of said elastomeric member to a predetermined amount of said torsional deflection.

4. A sign stand assembly according to claim 1, wherein said resilient biasing means includes at least one radially outer sleeve member fixedly interconnected with a radially outer portion of said elastomeric member, and at least one radially inner sleeve member fixedly interconnected with a radially inner portion of said elastomeric member; said base and said sign-supporting member being interconnected with opposite inner and outer sleeve members.

5. A sign stand assembly according to claim 4, wherein said elastomeric member is radially compressed between said inner and outer sleeve members in order to compressively preload said elastomeric member.

6. A sign stand assembly according to claim 4, further including a stop member interconnected with one of said inner and outer sleeve members, said stop member being interferingly engageable with a portion of said sign-supporting member in response to a predetermined amount of torsional deflection of said elastomeric member in order to substantially prevent further torsional deflection of said elastomeric member.

7. A sign stand assembly according to claim 4, including a pair of said sign-supporting members; said resilient biasing means including at least a pair of said elastomeric members, and at least a pair of said inner sleeve members; each of said inner sleeve members being fixedly interconnected with an associated one of said sign-supporting members and fixedly interconnected with said radially inner portion of one of said elastomeric members; said radially outer portions of both of said elastomeric members being fixedly interconnected with said base; said elastomeric members being torsionally preloaded in opposite circumferential directions relative to said torsion axis.

8. A sign stand assembly according to claim 7, wherein said resilient biasing means further includes at least a pair of said outer sleeve members, each of said outer sleeve members being fixedly interconnected with said radially outer portion of one of said elastomeric members and fixedly interconnected with said base.

9. A sign stand assembly according to claim 7, wherein said inner sleeve members and said associated sign-supporting members are oriented in radial directions that are circumferentially spaced apart relative to said torsion axis when said sign-supporting members are free of the sign, said inner sleeve members and said associated sign-supporting members being circumferentially rotatable toward one another into a common radial orientation and restrained in said common radial orientation when said sign-supporting member is secured to the sign in order to torsionally preload said elastomeric members in opposite circumferential directions relative to said torsional axis.

10. A sign stand assembly according to claim 9, wherein said resilient biasing means further includes at least a pair of said outer sleeve members, each of said outer sleeve members being fixedly interconnected with said radially outer portion of one of said elastomeric members and fixedly interconnected with said base, said sign stand assembly further including mounting means for circumferentially restraining said outer sleeve members and for fixedly interconnecting said outer sleeve members with said base.

11. A sign stand assembly according to claim 10, wherein said mounting means includes a mounting clamp at least in part surrounding said outer sleeve members and fixed to said base for clampingly securing said outer sleeve members to said base, said mounting clamp having at least one generally laterally-elongated opening therein, each of said outer sleeve members having at least one generally laterally-elongated tab on its outer periphery, said tabs on said outer sleeve members being interlockingly received in said laterally-extending opening in said mounting clamp in order to circumferentially restrain said outer sleeve relative to said base.

12. A sign stand assembly according to claim 1, wherein said resilient biasing means includes a pair of said elastomeric members with at least a portion of one of said elastomeric members being disposed relative outward of at least a portion of the other of said elastomeric members, and an intermediate sleeve member disposed radially between said outer and inner elastomeric members and fixedly interconnected therewith, one of said radially inner and outer elastomeric members being fixedly interconnected with said base and the other of said radially inner and outer elastomeric members being fixedly interconnected with said sign-supporting member, said radially inner and outer elastomeric members having different torsional spring rates in order to resiliently and torsionally deflect by different amounts in response to forces exerted on said sign-supporting member.

13. A sign stand assembly for supporting a sign, said sign stand assembly comprising: a base; a pair of sign-supporting members securable to the sign; and resilient biasing means interconnecting said base and said sign-supporting members for normally biasingly supporting said sign-supporting member in a generally longitudinally-extending orientation relative to said base, said resilient biasing means including at least one elastomeric member resiliently and torsionally deflectable about a generally laterally-extending torsion axis for allowing the sign and said sign-supporting members to pivotally deflect relative to said base from said generally longitudinally-extending orientation in response to predetermined forces exerted on said sign-supporting member in directions transverse to the sign, said resilient biasing means further including at least one radially outer sleeve member fixedly interconnected with a radially outer portion of said elastomeric member, and at least one radially inner sleeve member fixedly interconnected with a radially inner portion of said elastomeric member, said elastomeric member being compressed between said inner and outer sleeve members in order to compressively preload said elastomeric member; said base being interconnected with one of said inner and outer sleeve members, and said sign-supporting members being interconnected with the other of said inner and outer sleeve members and extending in opposite lateral directions therefrom.

14. A sign stand assembly according to claim 13, further including a stop member interconnected with one of said inner and outer sleeve members, said stop member being interferingly engageable with a portion of at least one of said sign-supporting members in response to a predetermined amount of torsional deflection of said elastomeric member in order to substantially prevent further torsional deflection of said elastomeric member.

15. A sign stand assembly according to claim 14, wherein each of said sign-supporting members is generally U-shaped in cross-section with a pair of spaced apart leg portions, said stop member including a protrusion disposed between said spaced apart leg portions in order to interferingly engage one of said leg portions in response to said predetermined amount of torsional deflection of said elastomeric member.

16. A sign stand assembly according to claim 15, wherein said protrusion is generally triangular in shape with an apex of said triangular shaped protrusion being disposed between said spaced apart leg portions, each side of said triangular shaped protrusion adjacent said apex being adapted to interferingly engage one of said leg portions in response to said predetermined amount of torsional deflection of said elastomeric member.

17. A sign stand assembly according to claim 14, wherein said stop member limits said torsional deflection of said elastomeric member to allow a maximum total pivotal deflection of the said sign-supporting members of approximately 55 degrees.

18. A sign stand assembly according to claim 13, wherein said inner sleeve member has a sleeve opening extending generally laterally therethrough, said sleeve opening having a non-circular cross-sectional shape, said resilient biasing means including a rod member extending through at least a portion of said sleeve opening and having a non-circular cross-sectional shape complementary with said non-circular cross-sectional shape of said sleeve opening in order to restrain said inner sleeve member from rotation relative to said rod member, said rod member being rotationally fixed relative to said sign-supporting members.

19. A sign stand assembly according to claim 13, wherein said inner sleeve member has a sleeve opening extending generally laterally therethrough, said sleeve opening having a non-circular cross-sectional shape, said resilient biasing means including a rod member extending through at least a portion of said sleeve opening and having a non-circular cross-sectional shape complementary with said non-circular cross-sectional shape of said sleeve opening in order to restrain said inner sleeve member from rotation relative to said rod member, said rod member being rotationally fixed relative to said base.

20. A sign stand assembly for supporting a sign, said sign stand assembly comprising: a base; at least one sign-supporting member; and resilient biasing means interconnecting said base and said sign-supporting member for normally biasingly supporting said sign-supporting member in a generally longitudinally-extending orientation relative to said base, said resilient biasing means including a pair of elastomeric members resiliently and torsionally deflectable about a generally laterally-extending torsion axis for allowing the sign and said sign-supporting member to pivotally deflect relative to said base from said generally longitudinally-extending orientation in response to predetermined forces exerted on said sign-supporting member in directions transverse to the sign, at least a portion of one of said elastomeric members being disposed radially outward of at least a portion of the other of said elastomeric members, said resilient biasing means further including an intermediate sleeve member disposed radially between said outer and inner elastomeric members and fixedly interconnected therewith, at least one radially outer sleeve member fixedly interconnected with a radially outer portion of said radially outer elastomeric member, and a radially inner sleeve member fixedly interconnected with a radially inner portion of said radially inner elastomeric member, said base being interconnected with one of said radially inner and outer sleeve members, and said sign-supporting member being interconnected with the other of said radially inner and outer sleeve members, said radially inner and outer elastomeric members having different torsional spring rates in order to resiliently and torsionally deflect by different amounts in response to forces exerted on said sign-supporting member.

21. A sign stand assembly according to claim 20, wherein said radially inner elastomeric member has a lower torsional spring rate than that of said radially outer elastomeric member.

22. A sign stand assembly according to claim 20, wherein said radially inner elastomeric member has a higher torsional spring rate than that of said radially outer elastomeric member.

23. A sign stand assembly according to claim 20, wherein said radially inner sleeve member has a sleeve opening extending generally laterally therethrough, said sleeve opening having a non-circular cross-sectional shape, said resilient biasing means including a rod member extending through at least a portion of said sleeve opening and having a non-circular cross-section shape complementary with said non-circular cross-sectional shape of said sleeve opening in order to restrain said radially inner sleeve member from rotation relative to said rod member, said rod member being rotationally fixed relative to said sign-supporting member.

24. A sign stand assembly according to claim 20, wherein said radially inner sleeve member has a sleeve opening extending generally laterally therethrough, said sleeve opening having a non-circular cross-sectional shape, said resilient biasing means including a rod member extending through at least a portion of said sleeve opening and having a non-circular cross-sectional shape complementary with said non-circular cross-sectional shape of said sleeve opening in order to restrain said radially inner sleeve member from rotation relative to said rod member, said rod member being rotationally fixed relative to said base.

25. A sign stand assembly according to claim 20, further including means for compressively preloading at least one of said elastomeric members.

26. A sign stand assembly according to claim 20, further including means for torsionally preloading at least one of said elastomeric members relative to said torsion axis.

27. A sign stand assembly according to claim 20, further including stop means for limiting the torsional deflection of said elastomeric members to a predetermined amount of said torsional deflection.

28. A sign stand assembly for supporting a sign, said sign stand assembly comprising: a base; a one-piece sign-supporting member securable to the sign; and resilient biasing means interconnecting said base and said sign-supporting member for normally biasingly supporting said sign-supporting member in a generally longitudinally-extending orientation relative to said base, said resilient biasing means including at least one elastomeric member resiliently and torsionally deflectable about a generally laterally-extending torsion axis for allowing the sign and said sign-supporting member to pivotally deflect relative to said base from said generally longitudinally-extending orientation in response to predetermined forces exerted on said sign-supporting member in directions transverse to the sign, said resilient biasing means further including at least one radially outer sleeve member fixedly interconnected with a radially outer portion of said elastomeric member, and at least one radially inner sleeve member fixedly interconnected with a radially inner portion of said elastomeric member, said elastomeric member being radially compressed between said inner and outer sleeve members in order to compressively preload said elastomeric member; said base and said one-piece sign-supporting member being interconnected with opposite inner and outer sleeve members of said resilient biasing means.

29. A sign stand assembly according to claim 28, further including a stop member interconnected with one of said inner and outer sleeve members, said stop member being interferingly engageable with a portion of said sign-supporting member in response to a predetermined amount of torsional deflection of said elastomeric member in order to substantially prevent further torsional deflection of said elastomeric member.

30. A sign stand assembly according to claim 28, further including means for torsionally preloading said elastomeric member relative to said torsion axis.

31. A method of making a torsionally preloaded torsion spring comprising:
   forming a composite axially-elongated generally cylindrical assembly having an outer rigid cylinder fixedly surrounding and attached to an elastomeric cylinder, which is in turn fixedly surrounding and attached to an inner rigid cylinder, said composite assembly having a pair of opposite free axial ends;
   forming axially elongated tabs protruding laterally outward in opposite directions from said outer rigid cylinder;
   forming mounting holes extending axially through said inner rigid cylinder for mounting a pair of objects to said opposite axial ends at circumferentially aligned orientations, said circumferential aligned orientations being circumferentially offset at a predetermined acute angular relationship with a first axial plane circumferentially perpendicular to a second axial plane extending through said tabs on opposite sides of said outer rigid cylinder;
   severing said composite assembly generally along a radial plane perpendicular to the axial centerline of said composite assembly and located at an axially intermediate position between the free axial ends of said composite assembly in order to form a pair of axially separable subassemblies;
   rotating one of said subassemblies end-for-end in said second axial plane and disposing said rotated subassembly adjacent the non-rotated subassembly with the free axial end of the rotated subassembly axially adjacent the severed axial end of the non-rotated subassembly and with axially adjacent tabs on opposite lateral sides of said subassemblies being circumferentially aligned with one another in order to circumferentially misalign said mounting holes through said inner rigid cylinder of said respective subassemblies at a predetermined circumferential angular relationship with one another;
   rotationally restraining said tabs on said subassemblies with respect to one another;
   mounting one of said pair of objects to the free axial end of said inner rigid cylinder to said non-rotated subassembly and mounting the other of said pair of objects to the severed axial end of said inner cylinder of said rotated subassembly with said objects in said predetermined circumferentially misaligned angular relationship; and
   rotating said objects and the respective inner cylinders in opposite directions about their respective axes into a circumferentially aligned relationship with one another in order to torsionally preload said elastomeric cylinders of the respective subassemblies in opposite circumferential directions.

32. A method according to claim 31, wherein said predetermined acute angular relationship is approximately ten degrees.

33. A method according to claim 31, wherein said tabs are rotationally restrained by fixedly clamping said tabs to another article using a clamp member having slots therein for interlockingly receiving said tabs.

34. A resilient mounting device for mounting a pivotally upstanding frame support to a base, said base having stationary ground engaging means,
   a torsion support means interconnecting said base to said upstanding support,
   said interconnecting means comprising a shaft member having an annulus of elastomeric material bonded thereon as the yieldable member,
   a housing member surrounding the outer periphery of said elastomeric annulus to compress said elastomeric annulus, said housing member bonded to said elastomeric annulus,
   one of said members of said torsion support means connected to said base and the other one of said members connected to said upstanding frame support for providing a pivotal structure on said base.

35. A resilient mounting device as set forth in claim 34, wherein said housing member has a split therein to define a gap, said housing member having a pair of spaced legs at said gap to facilitate the compression of said elastomeric material upon connection of said leg members.

36. A mounting device as set forth in claim 35, wherein said base has an upwardly extending bracket, the spacing between said legs being greater than the width of said upwardly extending bracket to provide compression of said elastomeric material as said legs are connected to said bracket.

37. A mounting device as set forth in claim 34, wherein said housing member has a split therein to define a gap, said housing member having a pair of spaced legs at said gap to facilitate the compression of said elastomeric material upon connection of said leg members to said upstanding frame support.

38. A mounting device as set forth in claim 37, wherein said frame support has a depending rod, the spacing between said leg members being greater than the width of said depending rod to provide compression of said elastomeric material as said leg members are connected to said rod.

39. A mounting device as set forth in claim 38, wherein said shaft member is polygonal in cross section, and said base having a pair of spaced plates with polygonal apertures for receiving the ends of said shaft member.

40. A mounting device as set forth in claim 37, wherein each of said upstanding legs have grooves, a bracket with a pair of vertically disposed side plates and a pair of links, said links extending into said grooves to exert a compressive force on said annulus of elastomeric material, and said side plates being attached to said upstanding frame support.

41. A resilient mounting device as set forth in claim 34, wherein said base includes a pair of spaced upstanding plates, one of said plates having a slot therein, said one member of said torsion support being a sleeve with a flattened end extending into said slot.

42. A resilient mounting device as set forth in claim 41, wherein said sleeve is a tubular member with a bore at the other end opposite said flattened end to receive a plug, said plug being connected to the other one of said plates of said upstanding plates.

43. A resilient mounting device as set forth in claim 42, wherein said bore is threaded, and said plug being threadedly connected to said bore.

44. A resilient mounting device for mounting a frame structure to a base, said base having ground engaging means, said frame structure receiving a display means, said frame structure having a depending support means, said base having a rubber torsion spring means interconnecting said base to said depending support means, said rubber torsion spring having an inner shaft secured to said base, said inner shaft keyed to a rigid sleeve member, a sleeve of rubber bonded internally to said rigid sleeve member, an outer shell having a pair of outwardly extending leg members, said shell bonded to the external surface of said rubber sleeve, said outer shell being split to define a gap between said leg members, said gap being greater in width than the width of said depending support means, said leg members being connected to said depending support means to exert a compressive force on said rubber sleeve.

45. A mounting device as set forth in claim 44, wherein each of said leg members has a groove therein, a U-shaped bracket with a pair of abutments slidingly received in said grooves, and said U-shaped bracket operative to compress said rubber sleeve and connected to said depending support means.

* * * * *

UNITED STATES PATENT AND TRADEMARK OFFICE
CERTIFICATE OF CORRECTION

PATENT NO. : 4,714,220

DATED : December 22, 1987

INVENTOR(S) : David U. Hillstrom and Dennis R. Cope

It is certified that error appears in the above-identified patent and that said Letters Patent is hereby corrected as shown below:

| | | |
|---|---|---|
| Column 1, | line 25, | after "signs" insert --used--. |
| Column 3, | line 43, | after "another" insert --alternate--. |
| Column 8, | line 1, | "increases" should be --increase--. |
| Column 9, | line 32, | after "pair" insert --of-- |
| Column 11, | line 32, | "werein" should be --wherein--. |
| Column 12, | line 45, | "831" 2nd occurrence should be --832--. |
| Column 15, | line 45, | "torsional" should be --torsion--. |
| Column 16, | line 4, | "relative" should be --radially--. |
| Column 19, | line 53, | "to" should be --of--. |

Signed and Sealed this

Twenty-seventh Day of September, 1988

Attest:

DONALD J. QUIGG

Attesting Officer   Commissioner of Patents and Trademarks